(12) United States Patent  
Presz, Jr. et al.

(10) Patent No.: US 7,976,270 B2
(45) Date of Patent: *Jul. 12, 2011

(54) TURBINE WITH MIXERS AND EJECTORS

(75) Inventors: Walter M. Presz, Jr., Wilbraham, MA (US); Michael J. Werle, West Hartford, CT (US)

(73) Assignee: FloDesign Wind Turbine Corp., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/565,090

(22) Filed: Sep. 23, 2009

(65) Prior Publication Data

US 2010/0086393 A1 Apr. 8, 2010

Related U.S. Application Data

(63) Continuation of application No. 12/054,050, filed on Mar. 24, 2008.

(60) Provisional application No. 60/919,588, filed on Mar. 23, 2007.

(51) Int. Cl.
*F03D 1/04* (2006.01)
(52) U.S. Cl. ........................................ 415/4.3
(58) Field of Classification Search ............ 290/44, 290/55; 415/2.1, 4.1, 4.3, 4.5, 227
See application file for complete search history.

(56) References Cited

U.S. PATENT DOCUMENTS

| 1,312,021 | A | 8/1919 | Dickinson et al. |
| 3,986,787 | A | 10/1976 | Mouton, Jr. et al. |
| 4,021,135 | A | 5/1977 | Pedersen et al. |
| 4,038,848 | A | 8/1977 | Ichiryu et al. |
| 4,075,500 | A | 2/1978 | Oman et al. |
| 4,077,206 | A | 3/1978 | Ayyagari |
| 4,140,433 | A | 2/1979 | Eckel |

(Continued)

FOREIGN PATENT DOCUMENTS

DE 101 45 786 10/2003

(Continued)

OTHER PUBLICATIONS

Igra, Ozer, "Research and Development for Shrouded Wind Turbines", Energy Cons. & Management, 1981, pp. 13-48, vol. 21.

(Continued)

*Primary Examiner* — Richard Edgar
(74) *Attorney, Agent, or Firm* — Richard M. Klein; Fay Sharpe LLP

(57) ABSTRACT

A Mixer/Ejector Wind/Water Turbine ("MEWT") system is disclosed which routinely exceeds the efficiencies of prior wind/water turbines. Unique ejector concepts are used to fluid-dynamically improve many operational characteristics of conventional wind/water turbines for potential power generation improvements of 50% and above. Applicants' preferred MEWT embodiment comprises: an aerodynamically contoured turbine shroud with an inlet; a ring of stator vanes; a ring of rotating blades (i.e., an impeller) in line with the stator vanes; and a mixer/ejector pump to increase the flow volume through the turbine while rapidly mixing the low energy turbine exit flow with high energy bypass fluid flow. The MEWT can produce three or more time the power of its un-shrouded counterparts for the same frontal area, and can increase the productivity of wind farms by a factor of two or more. The same MEWT is safer and quieter providing improved wind turbine options for populated areas.

20 Claims, 25 Drawing Sheets

U.S. PATENT DOCUMENTS

| | | | |
|---|---|---|---|
| 4,156,907 A | 5/1979 | Rawlings et al. |
| 4,166,596 A | 9/1979 | Mouton, Jr. et al. |
| 4,204,799 A | 5/1980 | de Geus |
| 4,218,175 A | 8/1980 | Carpenter |
| 4,320,304 A | 3/1982 | Karlsson et al. |
| 4,324,985 A | 4/1982 | Oman |
| 4,379,236 A | 4/1983 | Inoue |
| 4,422,820 A | 12/1983 | Kirsch et al. |
| 4,482,290 A | 11/1984 | Foreman et al. |
| 4,720,640 A | 1/1988 | Anderson et al. |
| 4,781,522 A | 11/1988 | Wolfram |
| 4,786,016 A | 11/1988 | Presz, Jr. et al. |
| 5,083,899 A | 1/1992 | Koch |
| 5,110,560 A | 5/1992 | Presz, Jr. et al. |
| 5,213,138 A | 5/1993 | Presz, Jr. |
| 5,230,369 A | 7/1993 | Presz, Jr. |
| 5,230,656 A | 7/1993 | Paterson et al. |
| 5,327,940 A | 7/1994 | Presz, Jr. |
| 5,440,875 A | 8/1995 | Torkelson et al. |
| 5,447,412 A | 9/1995 | Lamont |
| 5,464,320 A | 11/1995 | Finney |
| 5,506,453 A | 4/1996 | McCombs |
| 5,554,472 A | 9/1996 | Aizawa |
| 5,761,900 A | 6/1998 | Presz, Jr. |
| 5,836,738 A | 11/1998 | Finney |
| 5,884,472 A | 3/1999 | Presz, Jr. |
| 5,947,678 A | 9/1999 | Bergstein |
| 5,992,140 A | 11/1999 | Hammond et al. |
| 6,016,651 A | 1/2000 | Hammond et al. |
| 6,082,635 A | 7/2000 | Seiner et al. |
| 6,127,739 A | 10/2000 | Appa |
| 6,233,920 B1 | 5/2001 | Presz, Jr. et al. |
| 6,276,127 B1 | 8/2001 | Alberti |
| 6,278,197 B1 | 8/2001 | Appa |
| 6,311,928 B1 | 11/2001 | Presz, Jr. et al. |
| 6,382,904 B1 | 5/2002 | Orlov et al. |
| 6,655,907 B2 | 12/2003 | Brock et al. |
| 6,659,719 B2 * | 12/2003 | Angelis ...................... 415/211.2 |
| 6,854,260 B2 | 2/2005 | Anderson |
| 6,877,960 B1 | 4/2005 | Presz, Jr. et al. |
| 6,887,031 B1 | 5/2005 | Tocher |
| 7,017,331 B2 | 3/2006 | Anderson |
| 7,111,448 B2 | 9/2006 | Anderson |
| 7,144,216 B2 | 12/2006 | Hessel |
| 7,218,011 B2 | 5/2007 | Hiel et al. |
| 7,220,096 B2 | 5/2007 | Tocher |
| 7,251,927 B2 | 8/2007 | Anderson |
| 7,256,512 B1 | 8/2007 | Marquiss |
| 7,270,043 B2 | 9/2007 | Presz, Jr. et al. |
| 2004/0005226 A1 | 1/2004 | Smith, III |
| 2006/0151633 A1 | 7/2006 | Presz, Jr. et al. |

FOREIGN PATENT DOCUMENTS

| | | |
|---|---|---|
| JP | 61043276 A * | 3/1986 |
| WO | WO03/081031 A1 | 2/2003 |
| WO | WO2004/099607 | 11/2004 |
| WO | 2007/107505 | 9/2007 |

OTHER PUBLICATIONS

Future Energy Solutions, Inc.'S Wind Tamer™ Turbines video demonstration (CD) found on Future Energy Solutions, Inc.'s website (http://www.windtamerturbines.com/about-wind-tamer-turbines.asp), Oct. 8, 2008, Livonia, NY.; Artifact sheet enclosed for an item which cannot be scanned.

Igra, O., "Shrouds for Aerogenerators", AIAA Journal, Oct. 1976, pp. 1481-1483, vol. 14, No. 10.

Hansen, M.O.L. et al., "Effect of Placing a Diffuser around a Wind Turbine", Wind Energy, 2000, pp. 3:207-213.

RU 2147693, English Translation, FLS, Inc., Aug. 2010, pp. 1-16.

* cited by examiner

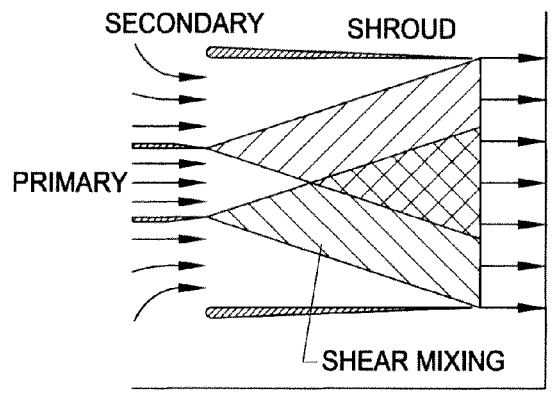
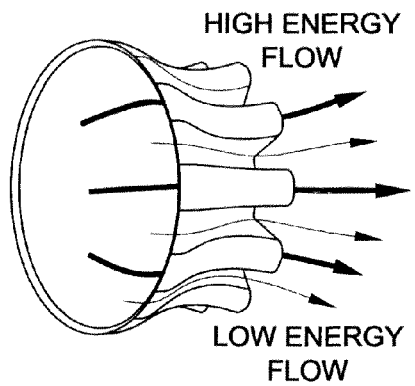
FIG. 32
FIG. 44
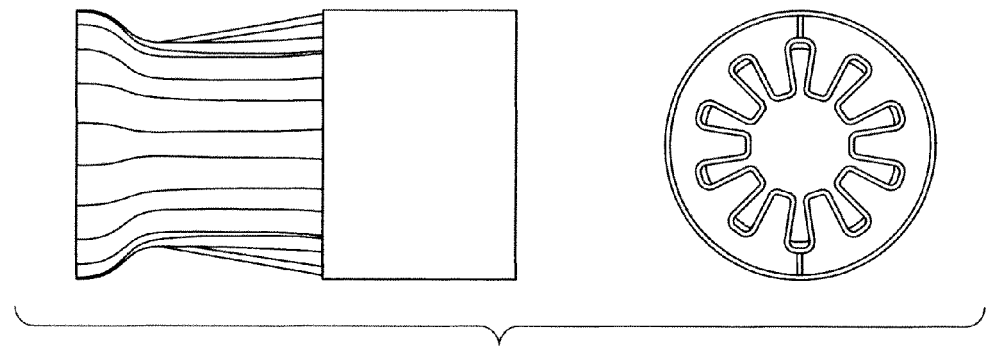
FIG. 45
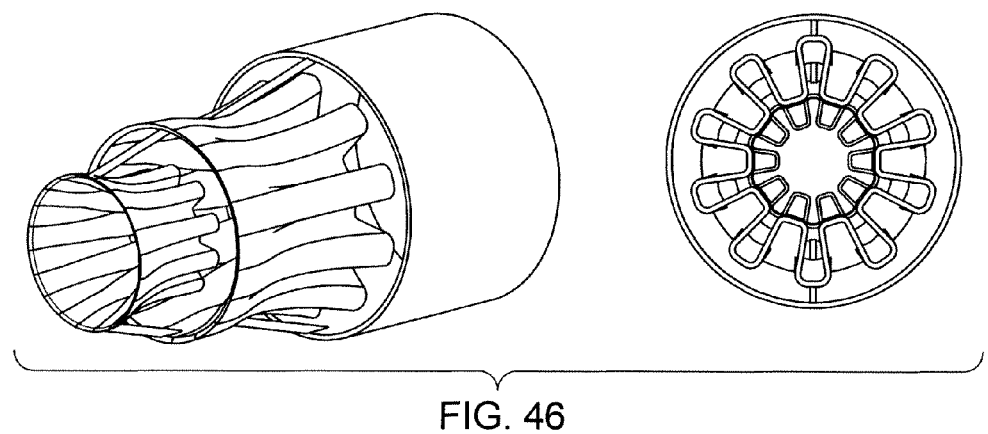
FIG. 46

TURBINE WITH MIXERS AND EJECTORS

RELATED APPLICATION

This application is a continuation-in-part of U.S. patent application Ser. No. 12/054,050, filed Mar. 24, 2008. That application claims priority from Applicants' U.S. Provisional Patent Application Ser. No. 60/919,588, filed Mar. 23, 2007. Applicants hereby incorporate the disclosure of both applications by reference in their entirety.

FIELD OF THE DISCLOSURE

The present disclosure relates generally to axial flow turbines, such as axial flow wind turbines and axial flow water turbines.

BACKGROUND

Improvements in the technology of electrical power generation by wind and current-based water turbines are being sought throughout the world as part of the effort to reduce dependency on fossil fuels. The European Union has recently announced a major sustainable energy project that includes significant use of wind power and is requesting the US to join this effort.

To fully achieve the ultimate potential of such systems, several problems/limitations need to be addressed. First, the family of existing wind/water turbines share a litany of troublesome limitations such as:

(1) Poor performance at low wind speeds, which is most relevant because many of the "good-wind" sites have been taken up and the industry has had to begin focusing on technologies for "small wind" sites, (2) Safety concerns due to poor containment for damaged propellers and shielding of rotating parts, (3) Irritating pulsating noise that can reach far from the source, (4) Significant bird strikes and kills, (5) Significant first and recurring costs due to:
  (i) expensive internal gearing, and
  (ii) expensive turbine blade replacements caused by high winds and wind gusts, plus (6) Poor and/or unacceptable esthetics for urban and suburban settings.

One of the underlying causes for the problems and limitations listed above is that the vast majority of existing wind/water turbine systems depend on the same design methodology. As a result, virtually all existing wind turbines are unshrouded/unducted, have only a few blades (which tend to be very long, thin and structurally vulnerable) and rotate at very low blade-hub speeds (thus requiring extensive internal gearing for electricity production) but have very high blade-tip speeds (with its attendant complications). These are all similar because they are all based on the same aerodynamic model that attempts to capture the maximum amount of the power available in the wind utilizing the "Betz Theory" for wind turbines, as disclosed below in more detail, with Schmitz corrections for flow swirl effects, aerodynamic profile losses and tip flow losses. This theory sets the current family of designs and leaves very little room for improving the aerodynamic performance. Thus industry's efforts have primarily become focused on all other non-aerodynamic aspects of the wind turbine, such as, production and life costs, structural integrity, etc.

In this regard, wind turbines usually contain a propeller-like device, termed the "rotor", which is faced into a moving air stream. As the air hits the rotor, the air produces a force on the rotor in such a manner as to cause the rotor to rotate about its center. The rotor is connected to either an electricity generator or mechanical device through linkages such as gears, belts, chains or other means. Such turbines are used for generating electricity and powering batteries. They are also used to drive rotating pumps and/or moving machine parts. It is very common to find wind turbines in large electricity generating "wind farms" containing multiple such turbines in a geometric pattern designed to allow maximum power extraction with minimal impact of each such turbine on one another and/or the surrounding environment.

The ability of a rotor to convert fluid power to rotating power, when placed in a stream of very large width compared to its diameter, is limited by the well documented theoretical value of 59.3% of the oncoming stream's power, known as the "Betz" limit as documented by A. Betz in 1926. This productivity limit applies especially to the traditional multi-bladed axial wind/water turbine presented in FIG. 1, labeled Prior Art.

Attempts have been made to try to increase wind turbine performance potential beyond the "Betz" limit. Conventional shrouds or ducts surrounding the rotor have been used. See, e.g., U.S. Pat. No. 7,218,011 to Hiel et al. (see FIG. 41); U.S. Pat. No. 4,204,799 to de Geus (see FIG. 42); U.S. Pat. No. 4,075,500 to Oman et al. (see FIG. 43); and U.S. Pat. No. 6,887,031 to Tocher. Properly designed shrouds cause the oncoming flow to speed up as it is concentrated into the center of the duct. In general, for a properly designed rotor, this increased flow speed causes more force on the rotor and subsequently higher levels of power extraction. Often though, the rotor blades break apart due to the shear and tensile forces involved with higher winds.

Values two times the Betz limit allegedly have been recorded but not sustained. See Igar, O., Shrouds for Aerogenerators, AIAA Journal, October 1976, pp. 1481-83; Igar & Ozer, Research and Development for Shrouded Wind Turbines, Energy Cons. & Management, Vol. 21, pp. 13-48, 1981; and see the AIAA Technical Note, entitled "Ducted Wind/Water Turbines and Propellers Revisited", authored by Applicants ("Applicants' AIAA Technical Note"), and accepted for publication. Copies can be found in Applicants' Information Disclosure Statement. Such claims however have not been sustained in practice and existing test results have not confirmed the feasibility of such gains in real wind turbine application.

To achieve such increased power and efficiency, it is necessary to closely coordinate the aerodynamic designs of the shroud and rotor with the sometimes highly variable incoming fluid stream velocity levels. Such aerodynamic design considerations also play a significant role on the subsequent impact of flow turbines on their surroundings, and the productivity level of wind farm designs.

In an attempt to advance the state of the art, ducted (also known as shrouded) concepts have long been pursued. These have consistently provided tantalizing evidence that they may offer significant benefits over those of traditional unducted design. However, as yet, none have been successful enough to have entered the marketplace. This is apparently due to several major weaknesses of current designs including: (a) they generally employ propeller based aerodynamic concepts versus turbine aerodynamic concepts, (b) they do not employ concepts for noise and flow improvements, and (c) they lack a first principles based ducted wind/water turbine design methodology equivalent to the "Betz/Schmitz Theory" that has been used extensively for unducted configurations.

Ejectors are well known and documented fluid jet pumps that draw flow into a system and thereby increase the flow rate through that system. Mixer/ejectors are short compact versions of such jet pumps that are relatively insensitive to incoming flow conditions and have been used extensively in high speed jet propulsion applications involving flow velocities near or above the speed of sound. See, for example, U.S. Pat. No. 5,761,900 by Dr. Walter M. Presz, Jr, which also uses a mixer downstream to increase thrust while reducing noise from the discharge. Dr. Presz is a co-inventor in the present application.

Gas turbine technology has yet to be applied successfully to axial flow wind turbines. There are multiple reasons for this shortcoming. Existing wind turbines use non-shrouded turbine blades to extract the wind energy. As a result, a significant amount of the flow approaching the wind turbine blades flows around and not through the blades. Also, the air velocity decreases significantly as it approaches existing wind turbines. Both of these effects result in low flow through, turbine velocities. These low velocities minimize the potential benefits of gas turbine technology such as stator/rotor concepts. Previous shrouded wind turbine approaches have keyed on exit diffusers to increase turbine blade velocities. Diffusers require long lengths for good performance, and tend to be very sensitive to oncoming flow variations. Such long, flow sensitive diffusers are not practical in wind turbine installations. Short diffusers stall, and just do not work in real applications. Also, the downstream diffusion needed may not be possible with the turbine energy extraction desired at the accelerated velocities. These effects have doomed all previous attempts at more efficient wind turbines using gas turbine technology.

Accordingly, it is a primary object of the present disclosure to provide an axial flow turbine that employs advanced fluid dynamic mixer/ejector pump principles to consistently deliver levels of power well above the Betz limit.

It is another primary object to provide an improved axial flow turbine that employs unique flow mixing (for wind turbines) and control devices to increase productivity of and minimize the impact of its attendant flow field on the surrounding environment located in its near vicinity, such as found in wind farms.

It is another primary object to provide an improved axial flow wind turbine that pumps in more flow through the rotor and then rapidly mixes the low energy turbine exit flow with high energy bypass wind flow before exiting the system.

It is a more specific object, commensurate with the above-listed objects, which is relatively quiet and safer to use in populated areas.

SUMMARY OF THE DISCLOSURE

A mixer/ejector wind or water turbine system (referenced herein as the "MEWT") for generating power is disclosed that combines fluid dynamic ejector concepts, advanced flow mixing and control devices, and an adjustable power turbine.

In some embodiments, the MEWT is an axial flow turbine comprising, in order going downstream: an aerodynamically contoured turbine shroud having an inlet; a ring of stators within the shroud; an impeller having a ring of impeller blades "in line" with the stators; a mixer, attached to the turbine shroud, having a ring of mixing lobes extending downstream beyond the impeller blades; and an ejector comprising the ring of mixing lobes and a mixing shroud extending downstream beyond the mixing lobes. The turbine shroud, mixer and ejector are designed and arranged to draw the maximum amount of fluid (e.g. wind or water) through the turbine and to minimize impact to the environment (e.g., noise) and other power turbines in its wake (e.g., structural or productivity losses). Unlike the conventional art, the preferred MEWT contains a shroud with advanced flow mixing and control devices such as lobed or slotted mixers and/or one or more ejector pumps. The mixer/ejector pump presented is much different than used in the aircraft industry since the high energy air flows into the ejector inlets, and outwardly surrounds, pumps and mixes with the low energy air exiting the turbine shroud.

In a first preferred embodiment, the MEWT comprises: an axial flow turbine surrounded by an aerodynamically contoured turbine shroud incorporating mixing devices in its terminus region (i.e., an end portion of the turbine shroud) and a separate ejector duct overlapping but aft of said turbine shroud, which itself may incorporate advanced mixing devices in its terminus region.

In an alternate embodiment, the MEWT comprises: an axial flow turbine surrounded by an aerodynamically contoured turbine shroud incorporating mixing devices in its terminus region.

First-principles-based theoretical analysis of the preferred MEWT indicates that the MEWT can produce three or more time the power of its un-shrouded counterparts for the same frontal area, and increase the productivity, in the case of wind turbines, of wind farms by a factor of two or more.

Also disclosed are methods of extracting additional energy or generating additional power from a fluid stream. The methods comprise providing a mixer shroud that divides incoming fluid into two fluid streams, one inside the mixer shroud and one outside the mixer shroud. Energy is extracted from the fluid stream passing inside the mixer shroud and through a turbine stage, resulting in a reduced-energy fluid stream. The reduced-energy fluid stream is then mixed with the other fluid stream, to form a series of vortices that mixes the two fluid streams and causes a lower-pressure area to form downstream of the mixer shroud. This in turn causes additional fluid to flow through the turbine stage.

Other objects and advantages of the current disclosure will become more readily apparent when the following written description is read in conjunction with the accompanying drawings.

BRIEF DESCRIPTION OF THE DRAWINGS

FIGS. 32, 44, 45, and 46 show a single-stage and multi-stage MEWT.

DETAILED DESCRIPTION OF PREFERRED EMBODIMENTS

Figure 27:
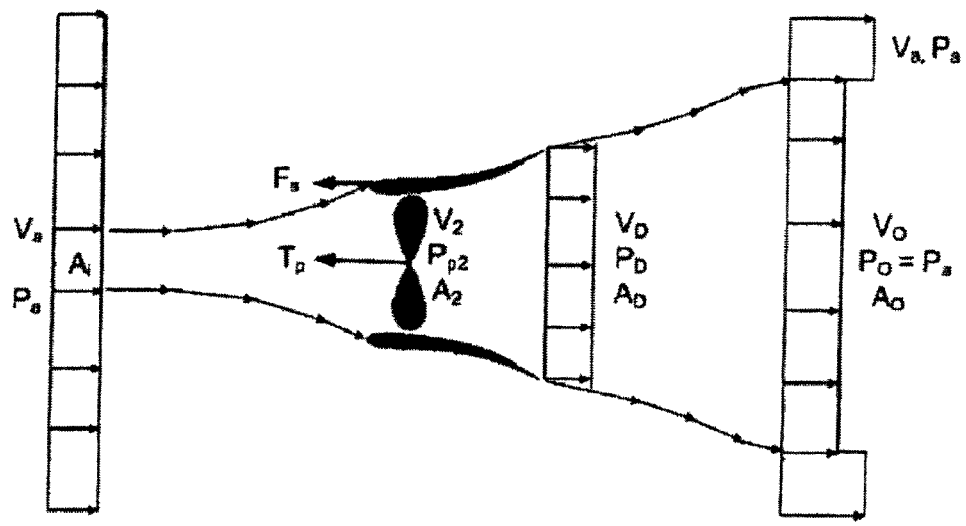
FIG. 27 shows the geometry and nomenclature used in a ducted power system.

In a one-dimensional actuator disc model, the turbine or propeller's effect is taken as a discontinuous extraction or addition of power. FIG. 27 provides the geometry and nomenclature for the more general ducted case. The unducted case is recovered when the duct size and the attendant force $F_s$ are allowed to shrink to zero. Using a control volume analysis that includes the turbine/propeller blade as a discontinuity as well as the inflows and outflows at upstream and downstream infinity, the conservation of mass, momentum and energy for a low speed and/or incompressible fluid leads to the equations for power and thrust as:

Power $$P = \frac{1}{4}\rho A_p (V_o^2 - V_a^2)(V_o + V_a) \quad \text{Equation (1)}$$

Thrust $$T = 2P/(V_o + V_a) \quad \text{Equation (2)}$$

The equations are first presented in dimensional form and later non-dimensionalized per their application. As seen, there are four variables, power P, thrust T, free stream velocity, $V_a$ and the downstream core velocity, $V_o$. For wind/water turbines, only forward velocity $V_a$ is known thus another independent equation is required to close the set. This is achieved by seeking the condition for capturing the maximum power, i.e., the value of $V_o$ for which P is maximum. This is obtained by setting the differential of Equation 1 to zero, for which one obtains the "Betz" limit as:

Betz Maximum Power Limit $$C_{P_{max}} = \frac{P_{max}}{\frac{1}{2}\rho A_p V_a^3} = \frac{16}{27} \quad \text{Equation (3)}$$

Figure 28:
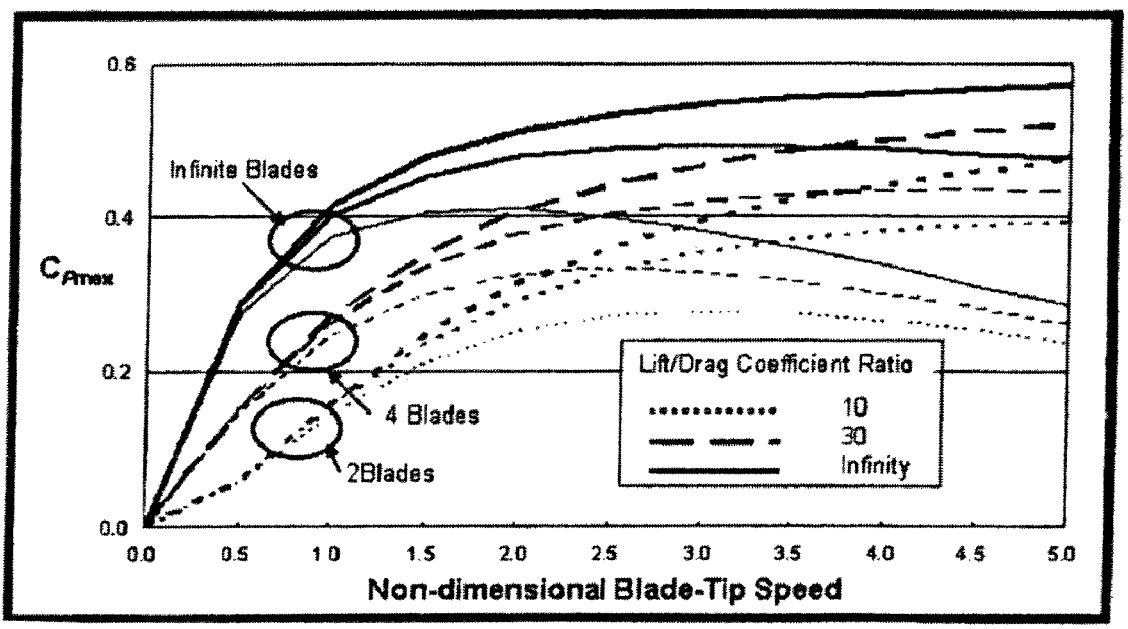
FIG. 28 is a graph showing the Schmitz corrections for an unducted turbine.

This result is of fundamental importance to wind/water turbine design. It is used as a core element in the detailed aerodynamic design of the cross sectional shape of the turbine blade along its radius so as to guarantee the capture of the maximum power available from the total flow passing over the blade. An additional adjustment is made to the blade designs in order to account for the reduction of the captured power due to residual swirl in the flow aft of the blade, blade tip losses, and aerodynamic profile losses—all of which are referred to as the Schmitz corrections. These loss effects are reproduced here in FIG. 28 in order to highlight an important fact—to capture anywhere near the Betz power extraction limit, the turbine blades must either have numerous blades or rotate with high tip speeds, have high aspect ratio, and have high lift to drag coefficients. Virtually all existing turbines, as exemplified by those shown in Prior Art FIG. 1, honor the aerodynamic requirements of this Betz-Schmitz analytical model.

Turning now to the propeller propulsion case, Equation 1 can be written as:

$$V_{op}^3 + V_{op}^2 V_{ap} - V_{op} V_{ap}^2 - 1 = 0 \quad \text{Equation (4a)}$$

Here a new power-based characteristic velocity, $V_p$ (this "Power" velocity is closely related to the disk loading coefficient used by others), has been defined as:

$$V_p \equiv \left(\frac{4P}{\rho A_p}\right)^{\frac{1}{3}} \quad \text{Equation (4b)}$$

and for convenience, the velocity ratios are written in shorthand fashion as:

$$V_{op} \equiv V_o/V_p \quad \text{Equation (4c)}$$

$$V_a/V_p \equiv V_a/V_p \quad \text{Equation (4d)}$$

The exact solution of Equation 4a is given as:

$$V_{op} = \left[\frac{1}{2} + \frac{8}{27}V_{ap}^3 + \frac{1}{2}\sqrt{\left(1 + \frac{16}{27}V_{ap}^3\right)^2 - \frac{64}{729}V_{ap}^6}\right]^{\frac{1}{3}} +$$

$$\left[\frac{1}{2} + \frac{8}{27}V_{ap}^3 - \frac{1}{2}\sqrt{\left(1 + \frac{16}{27}V_{ap}^3\right)^2 - \frac{64}{729}V_{ap}^6}\right]^{\frac{1}{3}} - \frac{1}{3}V_{ap} \quad \text{Equation (4e)}$$

which can be approximated using a series expansion for as:

$$V_{op} \approx 1 - \frac{1}{3}V_{ap} + \frac{4}{9}V_{ap}^2 \quad \text{Equation (4f)}$$

Figure 29:
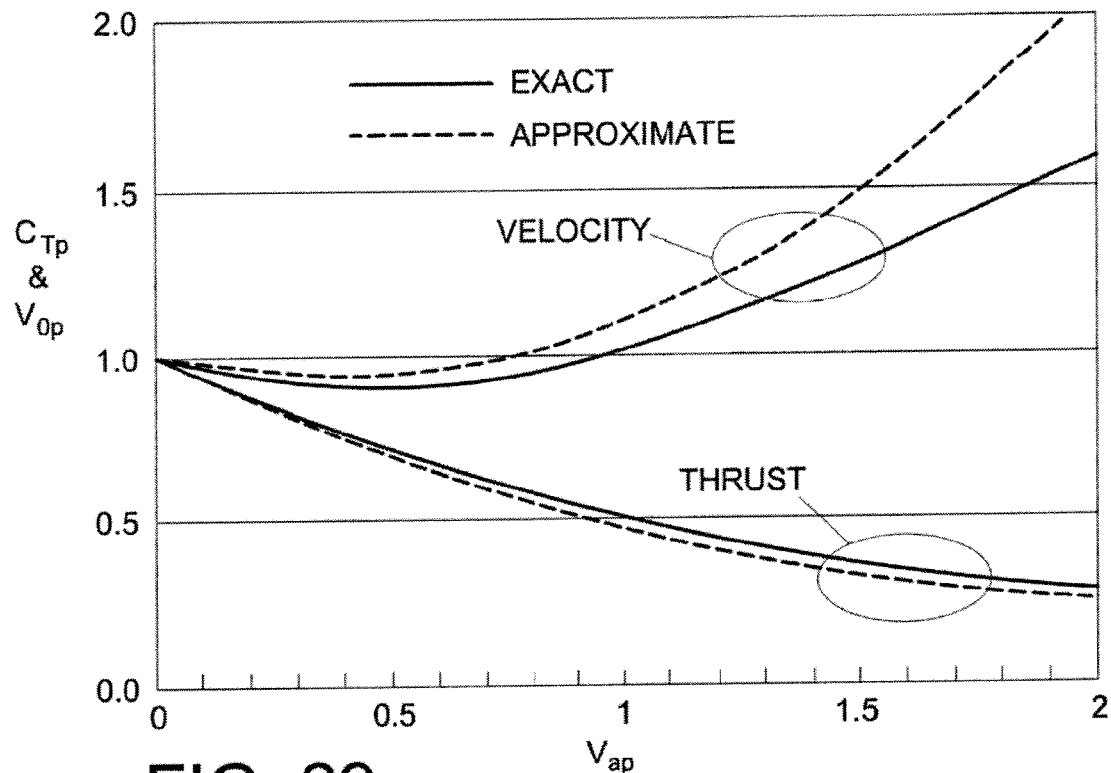
FIG. 29 is a graph showing the degree of correspondence between an approximate solution and an exact solution for an equation.

As shown in FIG. 29, this approximation of Equation 4e holds over a surprisingly wide range of $V_{ap}$. The situation is even better for the propeller thrust, which can now be calculated using either Equation 4(e) or its approximation Equation 4(f) in Equation 2. The results are also presented in FIG. 29 in terms of a propeller thrust coefficient, $C_T$ herein defined as:

$$C_{T_p} \equiv \frac{T}{\frac{1}{2}\rho A_p V_p^2} = 1/(V_{op} + V_{ap}) \quad \text{Equation (4g)}$$

Again it is noted from FIG. 29 that use of Equation 4f gives a good representation of the exact solution as:

$$C_{T_p} \approx 1 / \left(1 + \frac{2}{3}V_{ap} + \frac{4}{9}V_{ap}^2\right) \quad \text{Equation (4h)}$$

Equations 1 thru 4 give a complete representation for power generating wind/water turbines. It remains now to first generalize these for ducted configurations and then for mixer-ejector configurations.

Extension of the actuator-disc based analytical model presented in Equations 1-4 to ducted configurations is straight forward. Referring again to FIG. 27, the power and thrust equations become:

Power $$P = \frac{1}{4}[\rho A_p(V_o^2 - V_a^2) + F_s](V_o + V_a) \quad \text{Equation (5)}$$

Thrust $$T = 2P/(V_o + V_a) \quad \text{Equation (6)}$$

These equations explicitly retain the shroud/duct force, $F_s$, influence on flow field. The force, $F_s$, is generated in the current inviscid flow model through introduction of circulation about the ring airfoil formed by the shroud/duct.

These equations introduce a flow boundary condition and therein correct previously proposed and used models. In all previous applications of the one-dimensional actuator disc model to ducted wind/water turbines, the equation set was closed by imposing the pressure level as a downstream boundary condition at the duct exit plane, $A_D$.

The significance of this correction is most important for producing the Betz limit-power equivalent for ducted configurations. From Equation 5 it is shown that the maximum power for a ducted wind/water turbine is given as:

Ducted Wind/Water Turbine Power Limit $$C_{P_{max}} = \frac{16}{27}\left[\frac{\sqrt{1 - \frac{3}{4}C_s} + 1 - \frac{3}{2}C_s}{2}\right]\left[\frac{\sqrt{1 - \frac{3}{4}C_s} + 1}{2}\right] \quad \text{Equation (7)}$$

where the nondimensional shroud/duct force coefficient is given as:

$$C_s \equiv \frac{F_s}{\frac{1}{2}\rho A_p V_a^2} \quad \text{Equation (7b)}$$

Figure 30:
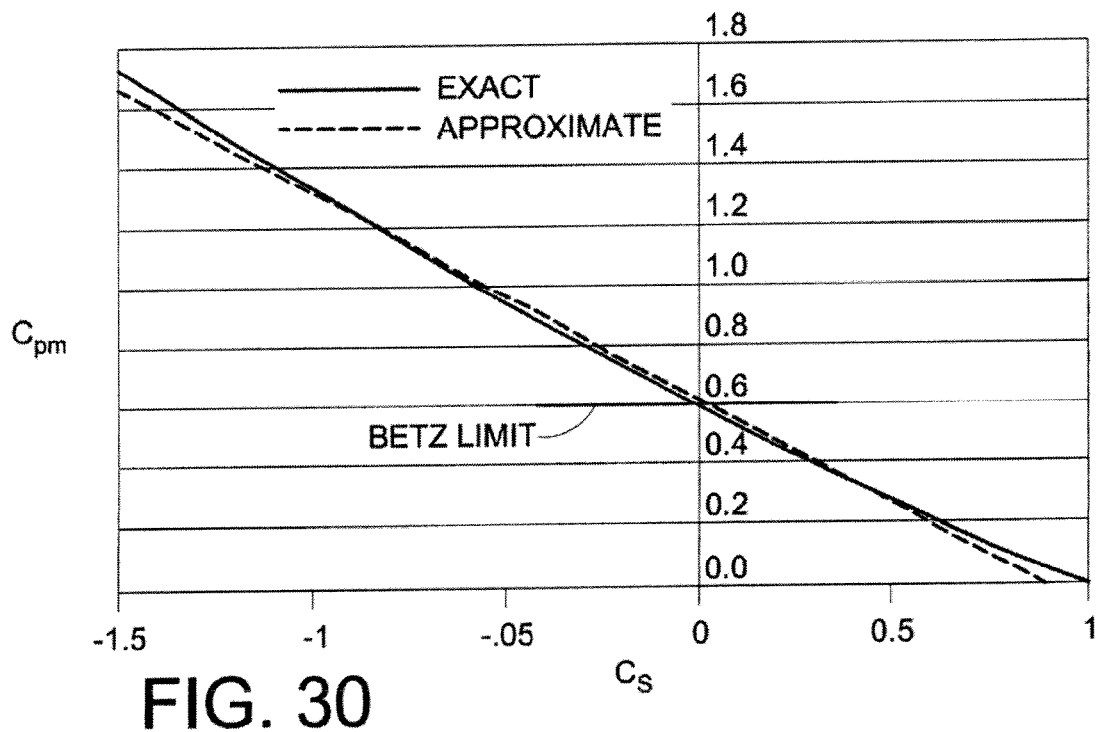
FIG. 30 is a graph showing the degree of correspondence between an approximate solution and an exact solution for an equation of the maximum power for a ducted wind/water turbine.

Note this model captures the unducted case ($C_s = 0$) as but one of an infinite family of ducted wind/water turbines, as shown in FIG. 30. Also shown is a Taylor series approximation of Equation 7a given as:

$$C_{P_{max}} = \frac{16}{27}\left[1 - \frac{9}{8}C_s\right] \quad \text{Equation (7c)}$$

which enjoys a surprising wide range of applicability.

Equations 7a-7c provide a missing Betz-like core element for the detailed design of the cross sectional shape of the turbine/propeller blades so as to guarantee the capture of the maximum power available from the flow passing over the blade, as well as the basis for Schmitz-like analysis correcting the results for swirl and aerodynamic profile losses.

Most significantly, it is observed that: (a) ducted props are theoretically capable of capturing many times the power of a bare wind/water turbine and (b) there is but a single parameter, $C_s$, and by association the circulation about the duct, that determines the maximum power that can be extracted from the flow. This now explicit relationship that couples the design of the blades and its surrounding duct must be satisfied in order to achieve optimal power extraction. With this new model in hand, a rational approach to the design of wind/water turbines can proceed with the potential for achieving maximum power output available.

A complete set of related results are presented below and in FIGS. 31(a), 31(b), and 31(c).

$$V_{oa_m} = \frac{1}{3}\left[2\sqrt{1-\frac{3}{4}C_s} - 1\right] \quad \text{Equation (7d)}$$

$$V_{pa_m} = \frac{1}{2}(V_{oa}+1) + \frac{C_s}{2}\bigg/(V_{oa}-1) \quad \text{Equation (7e)}$$

$$T_{PT_m} \equiv (T_P/T_{Total})_m = 1 - C_s/(1-V_{oa}^2) \quad \text{Equation (7f)}$$

$$A_{op_m} \equiv (A_o/A_p)_m = V_{pa_m}/V_{oa_m} \quad \text{Equation (7g)}$$

$$A_{ip_m} \equiv (A_i/A_p)_m = V_{pa_m} \quad \text{Equation (7h)}$$

Figure 31:
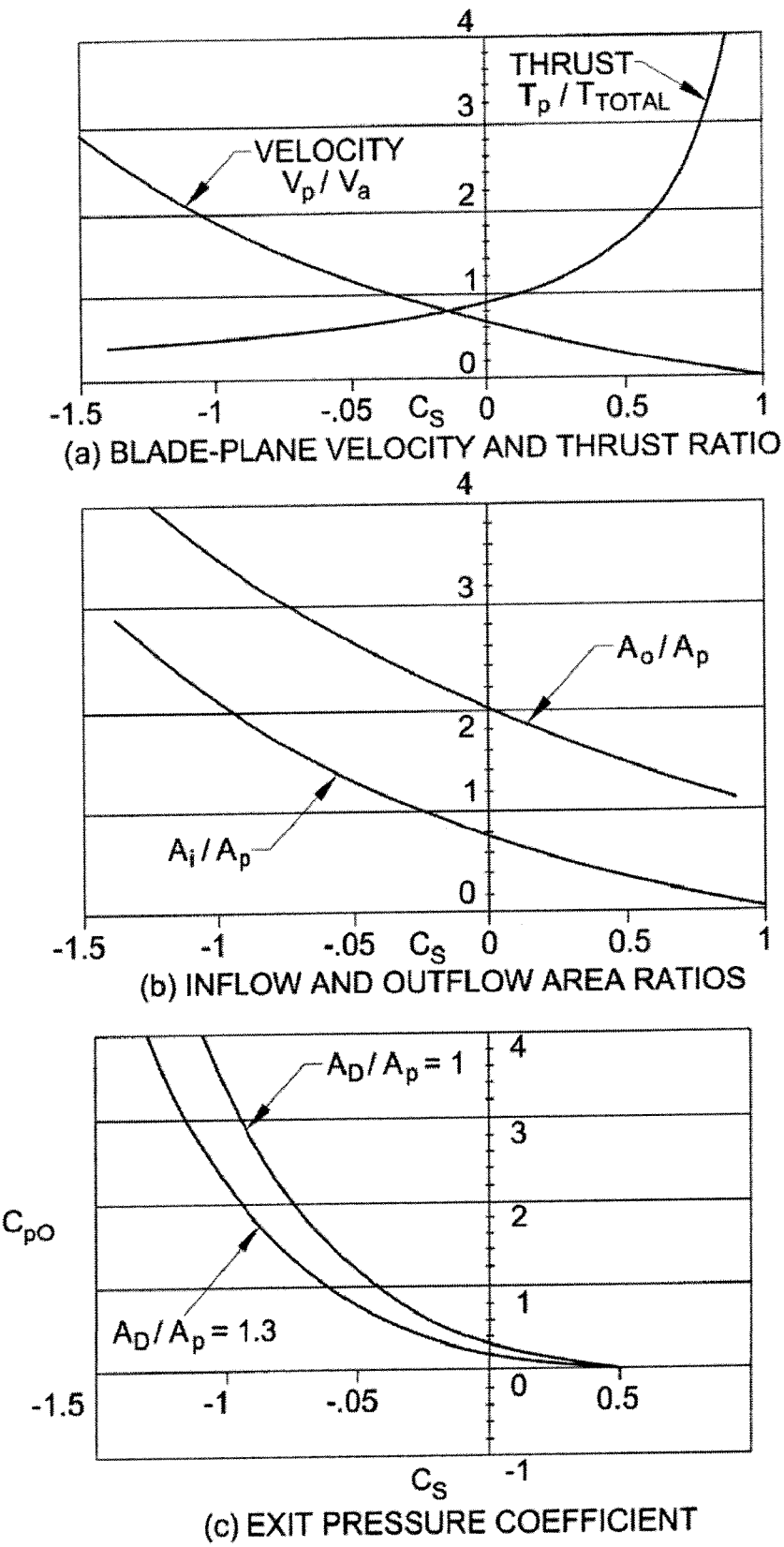
FIGS. 31(*a*), 31(*b*), and 31(*c*) show related results for a ducted wind/water turbine.

Flow conditions at the exit plane, $A_D$, of FIG. 27, can be calculated using Bernoulli's equation to show that in order to achieve maximum power extraction, the duct exit pressure coefficient and exit area diffusion ratio must satisfy the relation:

$$C_{P_D} = \frac{P_a - P_D}{\frac{1}{2}\rho V_a^2} = \frac{(V_P/V_a)^2}{(A_D/A_P)^2} - \left(\frac{V_o}{V_a}\right)^2 \quad \text{Equation (7i)}$$

where the area ratio is given in shorthand fashion as:

$$A_{DP} \equiv A_D/A_P \quad \text{Equation (7j)}$$

and the results are shown in FIG. 31(c) for two duct area diffusion ratios.

Figure 33:
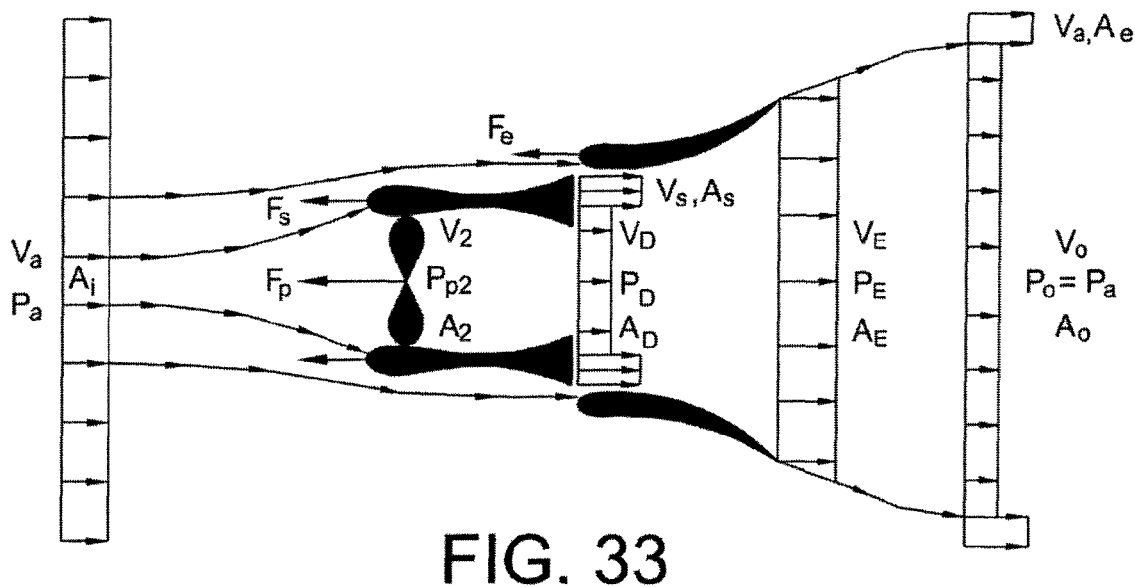
FIG. 33 shows the geometry and nomenclature used in a single-stage MEWT.

A sophisticated and unique design system and methodology for single and multi-stage mixer-ejectors can be applied to enhance subsonic ducted power systems. It is necessary to couple the governing equations for the flow through multi-stage mixers to the flow field of the ducted configuration shown in FIG. 27, leading to the flow configuration shown in FIG. 33 for the case of a single stage mixer-ejector wind/water turbine system.

Following the same procedure as for the unducted and ducted cases above, but adding in mass, momentum and energy conservation internal to the ejector duct, the three governing equations are given as:

Power $$P = \frac{1}{2}\rho A_D V_D (V_S^2 - V_D^2) \quad \text{Equation (8)}$$

Overall Momentum Balance $$\frac{1}{2}\rho A_P(V_D^2 - V_S^2) + F_s + F_e = \rho A_D V_D(1 + r_S V_{SD})(V_o - V_a) \quad \text{Equation (9)}$$

where the shroud/duct and ejector force coefficient has been defined as:

$$C_{se} \equiv \frac{F_s + F_e}{\frac{1}{2}\rho V_a^2} \quad \text{Equation (9b)}$$

Ejector Flow $$(V_S + r_S V_D)^2 = (1 + r_S)^2[V_a^2 + V_D^2 - V_o^2] \quad \text{Equation (10a)}$$

where the ejector inlet area parameter $r_s$ has been defined as:

$$r_S = A_S/A_D \quad \text{Equation (10b)}$$

For the wind/water turbine case, this system of equations can be used to determine the Betz equivalent maximum power for extraction by a mixer-ejector by differentiating Equation 8, substituting the relevant terms from Equation 9 and Equation 10a, setting the derivative to zero, and solving iteratively. The results are presented in FIG. 34 in terms of the ratio of extracted power to the bare prop maximum, i.e. the Betz limit:

$$r \equiv C_{P_{max}}\bigg/\left(\frac{16}{27}\right) \quad \text{Equation (11)}$$

Figure 34:
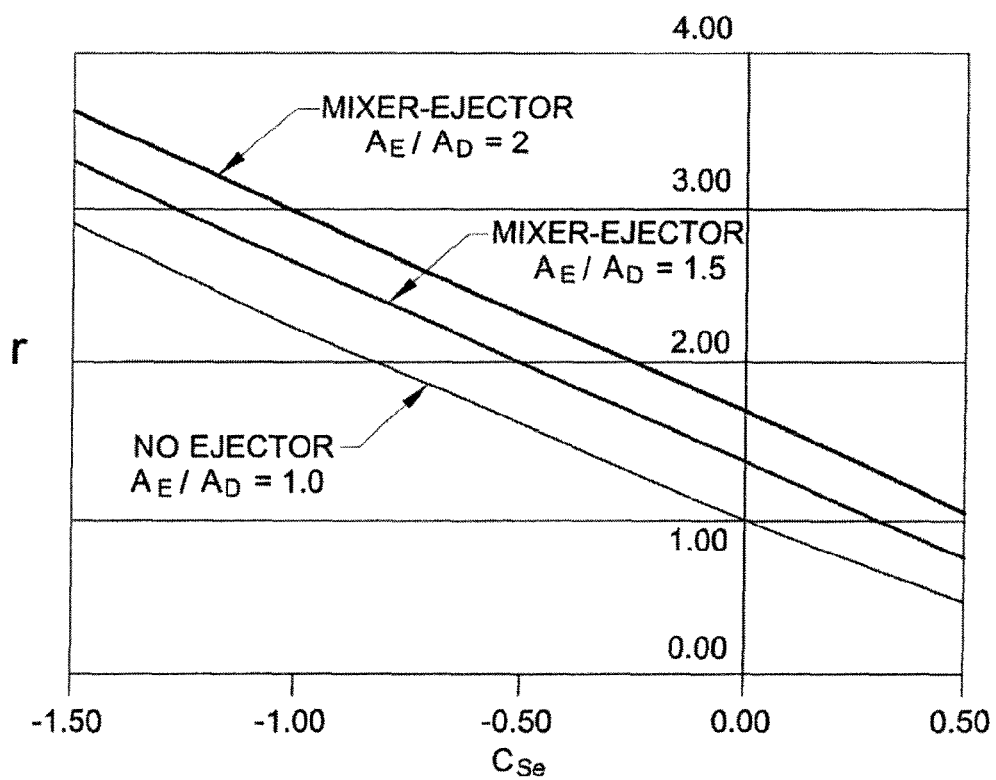
FIG. 34 is a graph showing the predicted Betz equivalent maximum power that can be extracted by a mixer-ejector system, a ducted system, and an unducted system.

It is seen that mixer-ejectors significantly increase the maximum power extraction potential over that of the unducted case ($C_{se}$=0, $A_e/A_D$=1) as well as the ducted case (0>$C_{se}$>0, $A_e/A_D$=1). FIG. 34 indicates that levels of 2 and 3 times the bare turbine case and 70% greater than the ducted case are obtainable.

A Mixer-Ejector Power System (MEPS) provides a unique and improved means of generating power from wind or water currents or generating propulsion thrust using air or water exhaust jets. A MEPS includes:
  a primary duct containing a turbine or propeller blade which extracts or adds power to the primary stream; and
  a single or multiple-stage mixer-ejector to ingest flow with each such mixer/ejector stage including a mixing duct for both bringing in secondary flow and providing flow mixing-length for the ejector stage. The mixing duct inlet contours are designed to minimize flow losses while providing the pressure forces necessary for good ejector performance.

The resulting mixer/ejectors enhances the operational characteristics of the power system by: (a) increasing the amount of flow through the system, (b) reducing the back pressure on the turbine blade, and (c) reducing the noise propagating from the system.

The MEPS may include:
  camber to the duct profiles to enhance the amount of flow into and through the system;
  acoustical treatment in the primary and mixing ducts for noise abatement flow guide vanes in the primary duct for control of flow swirl and/or mixer-lobes tailored to diminish flow swirl effects;
  turbine-like blade aerodynamics designs based on the new theoretical power limits to develop families of short, structurally robust configurations which may have multiple and/or counter-rotating rows of blades;
  exit diffusers or nozzles on the mixing duct to further improve performance of the overall system;
  inlet and outlet areas that are non-circular in cross section to accommodate installation limitations;
  a swivel joint on its lower outer surface for mounting on a vertical stand/pylon allowing for turning the system into the wind or water current;

vertical aerodynamic stabilizer vanes mounted on the exterior of the ducts with tabs to keep the system pointed into the wind or water current; or mixer lobes on a single stage of a multi-stage ejector system.

Referring to the drawings in detail, FIGS. 2-25 show alternate embodiments of Applicants' axial flow Wind/Water Turbine with Mixers and Ejectors ("MEWT").

In the preferred embodiment (see FIGS. 2, 3, 4, 5), the MEWT 100 is an axial flow turbine comprising:

(a) an aerodynamically contoured turbine shroud 102;

(b) an aerodynamically contoured center body 103 within and attached to the turbine shroud 102;

(c) a turbine stage 104, surrounding the center body 103, comprising a stator ring 106 of stator vanes (e.g., 108*a*) and an impeller or rotor 110 having impeller or rotor blades (e.g., 112*a*) downstream and "in-line" with the stator vanes (i.e., leading edges of the impeller blades are substantially aligned with trailing edges of the stator vanes), in which:

(i) the stator vanes (e.g., 108*a*) are mounted on the center body 103;

(ii) the impeller blades (e.g., 112*a*) are attached and held together by inner and outer rings or hoops mounted on the center body 103;

(d) a mixer 118 having a ring of mixer lobes (e.g., 120*a*) on a terminus region (i.e., end portion) of the turbine shroud 102, wherein the mixer lobes (e.g., 120*a*) extend downstream beyond the impeller blades (e.g., 12*a*); and (e) an ejector 122 comprising a shroud 128, surrounding the ring of mixer lobes (e.g., 120*a*) on the turbine shroud, wherein the mixer lobes (e.g., 120*a*) extend downstream and into an inlet 129 of the ejector shroud 128.

Figure 7:
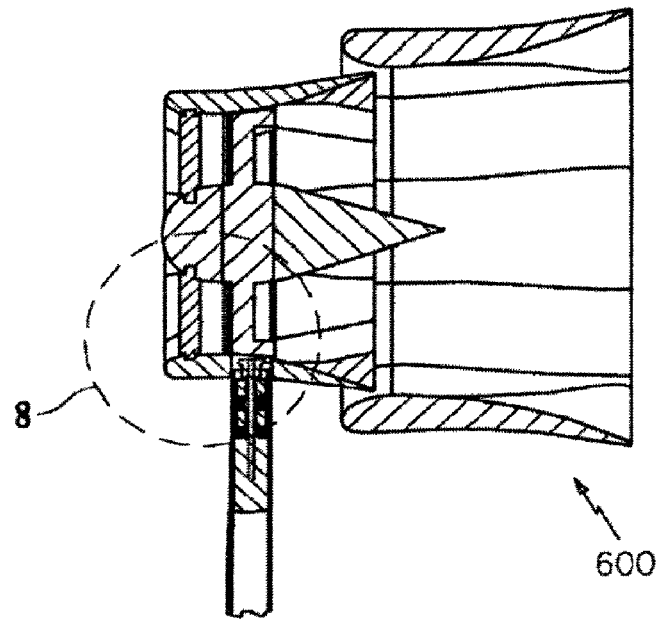
FIG. 7 is a side cross-sectional view of the MEWT of FIG. 6.

The center body 103 MEWT 100, as shown in FIG. 7, is preferably connected to the turbine shroud 102 through the stator ring 106 (or other means) to eliminate the damaging, annoying and long distance propagating low-frequency sound produced by traditional wind turbines as the turbine's blade wakes strike the support tower. The aerodynamic profiles of the turbine shroud 102 and ejector shroud 128 preferably are aerodynamically cambered to increase flow through the turbine rotor.

Applicants have calculated, for optimum efficiency in the preferred embodiment 100, the area ratio of the ejector pump 122, as defined by the ejector shroud 128 exit area over the turbine shroud 102 exit area will be between 1.5 and 3.0. The number of mixer lobes (e.g., 120*a*) would be between 6 and 14. Each lobe will have inner and outer trailing edge angles between 5 and 25 degrees. The primary lobe exit location will be at, or near, the entrance location or inlet 129 of the ejector shroud 128. The height-to-width ratio of the lobe channels will be between 0.5 and 4.5. The mixer penetration will be between 50% and 80%. The center body 103 plug trailing edge angles will be thirty degrees or less. The length to diameter (L/D) of the overall MEWT 100 will be between 0.5 and 1.25.

First-principles-based theoretical analysis of the preferred MEWT 100, performed by Applicants, indicate: the MEWT can produce three or more time the power of its un-shrouded counterparts for the same frontal area; and the MEWT can increase the productivity of wind farms by a factor of two or more. See Applicants' AIAA Technical Note, identified in the Background above, for the methodology and formulae used in their theoretical analysis.

Figure 1:
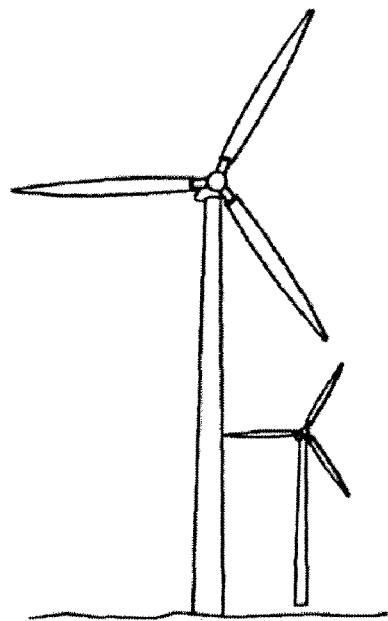
FIGS. 1, 41, 42, and 43, labeled "Prior Art", illustrate examples of prior turbines.
Figure 41:
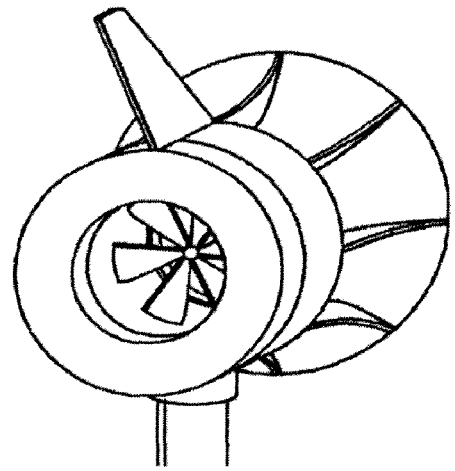
Figure 42:
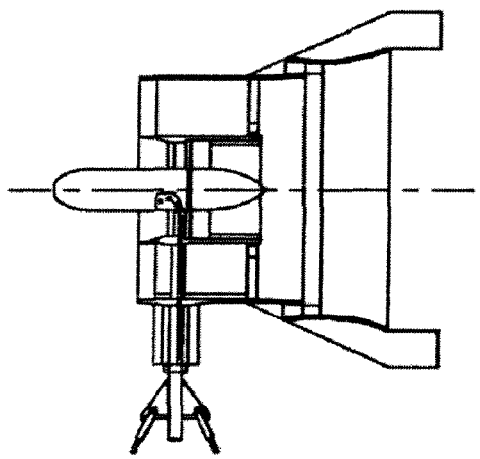
Figure 43:
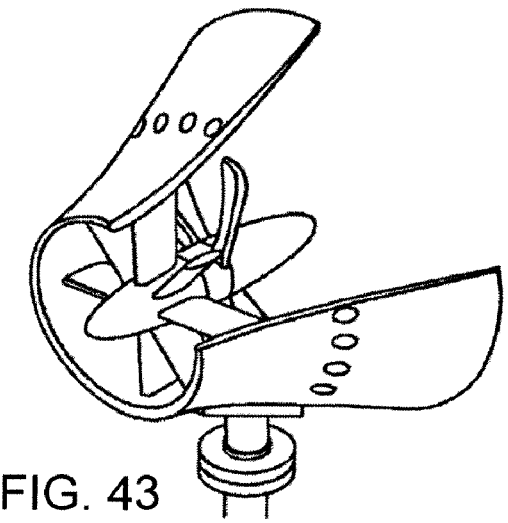

Based on this theoretical analysis, it is believed the preferred MEWT embodiment 100 will generate three times the existing power of the same size conventional wind turbine (shown in FIG. 1).

In simplistic terms, the preferred embodiment 100 of the MEWT comprises: an axial flow turbine (e.g., stator vanes and impeller blades) surrounded by an aerodynamically contoured turbine shroud 102 incorporating mixing devices in its terminus region (i.e., end portion); and a separate ejector shroud (e.g., 128) overlapping, but aft, of turbine shroud 102, which itself may incorporate advanced mixing devices (e.g., mixer lobes) in its terminus region. Applicants' ring 118 of mixer lobes (e.g., 120*a*) combined with the ejector shroud 128 can be thought of as a mixer/ejector pump. This mixer/ejector pump provides the means for consistently exceeding the Betz limit for operational efficiency of the wind turbine.

Applicants have also presented supplemental information for the preferred embodiment 100 of MEWT shown in FIGS. 2A, 2B. It comprises a turbine stage 104 (i.e., with a stator ring 106 and an impeller 110) mounted on center body 103, surrounded by turbine shroud 102 with embedded mixer lobes (e.g., 120*a*) having trailing edges inserted slightly in the entrance plane of ejector shroud 128. The turbine stage 104 and ejector shroud 128 are structurally connected to the turbine shroud 102, which itself is the principal load carrying member.

The length of the turbine shroud 102 is equal or less than the turbine shroud's outer maximum diameter. The length of the ejector shroud 128 is equal or less than the ejector shroud's outer maximum diameter. The exterior surface of the center body 103 is aerodynamically contoured to minimize the effects of flow separation downstream of the MEWT 100. It may be longer or shorter than the turbine shroud 102 or the ejector shroud 128, or their combined lengths.

The turbine shroud's entrance area and exit area will be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the turbine and to otherwise vary smoothly from their respective entrance planes to their exit planes. The turbine and ejector shrouds' external surfaces are aerodynamically shaped to assist guiding the flow into the turbine shroud inlet, eliminating flow separation from their surfaces, and delivering smooth flow into the ejector entrance 129. The ejector 128 entrance area, which may be noncircular in shape (see, e.g., FIG. 25), is larger than the mixer 118 exit plane area and the ejector's exit area may also be noncircular in shape.

Optional features of the preferred embodiment 100 can include: a power take-off 130 (see FIGS. 4 and 5), in the form of a wheel-like structure, which is mechanically linked at an outer rim of the impeller 110 to a power generator (not shown); a vertical support shaft 132 with a rotatable coupling at 134 (see FIG. 5), for rotatably supporting the MEWT 100, which is located forward of the center-of-pressure location on the MEWT for self-aligning the MEWT; and a self-moving vertical stabilizer or "wing-tab" 136 (see FIG. 4), affixed to upper and lower surfaces of ejector shroud 128, to stabilize alignment directions with different wind streams.

MEWT 100, when used near residences can have sound absorbing material 138 affixed to the inner surface of its shrouds 102, 128 (see FIG. 24) to absorb and thus eliminate the relatively high frequency sound waves produced by the interaction of the stator 106 wakes with the impeller 110. The MEWT can also contain safety blade containment structure (not shown)

Figure 14:
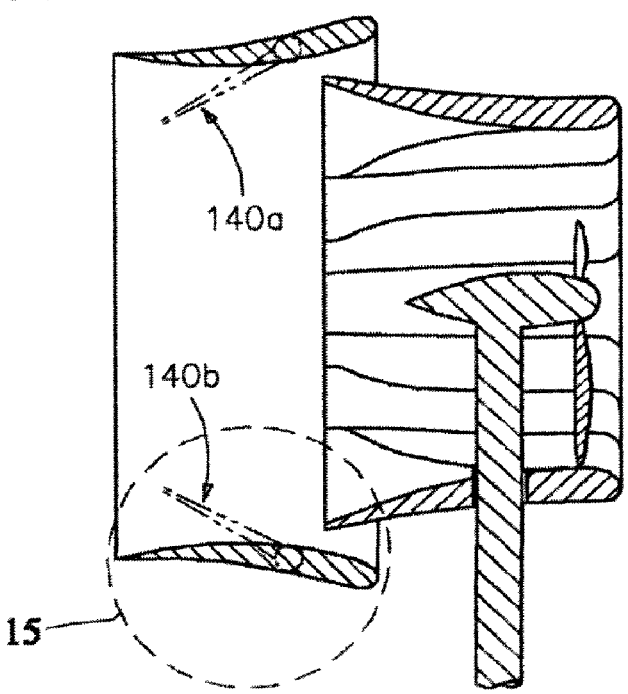
FIG. 14 is a side cross-sectional view, taken along sight line 14-14 of FIG. 13, showing two pivotable blockers for flow control.
Figure 15:
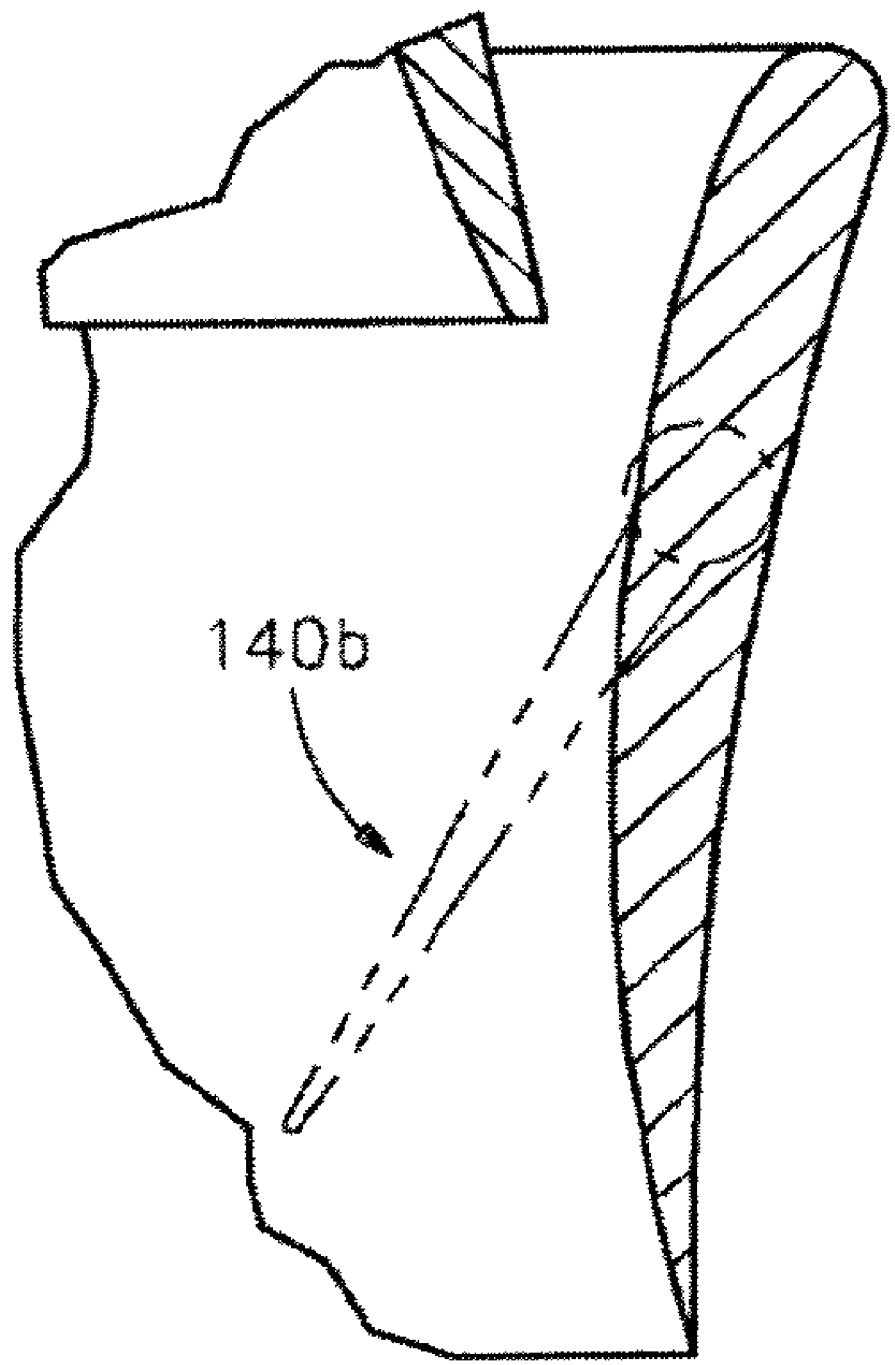
FIG. 15 is a close-up of an encircled blocker in FIG. 14.
Figure 16:
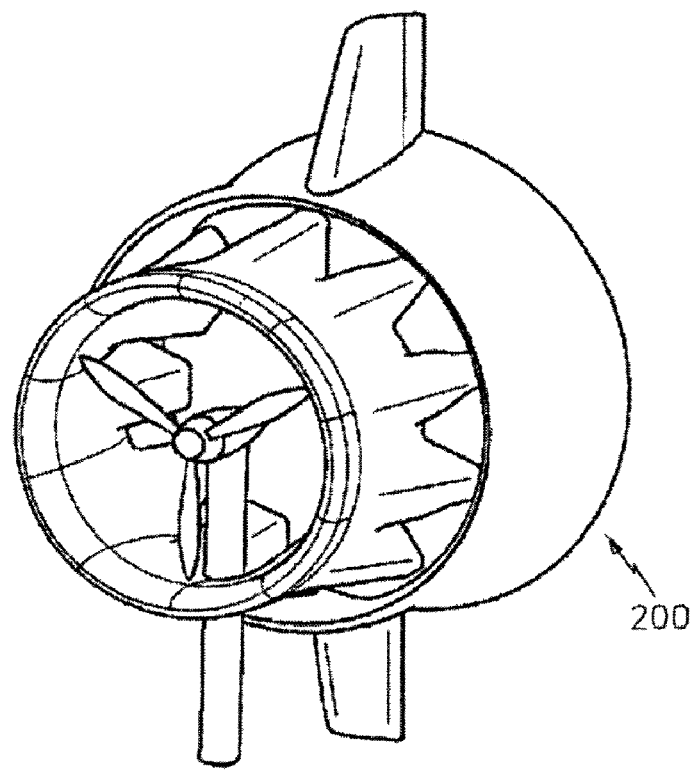
FIG. 16 illustrates an alternate embodiment of an MEWT with two optional pivoting wing-tabs for wind alignment.
Figure 17:
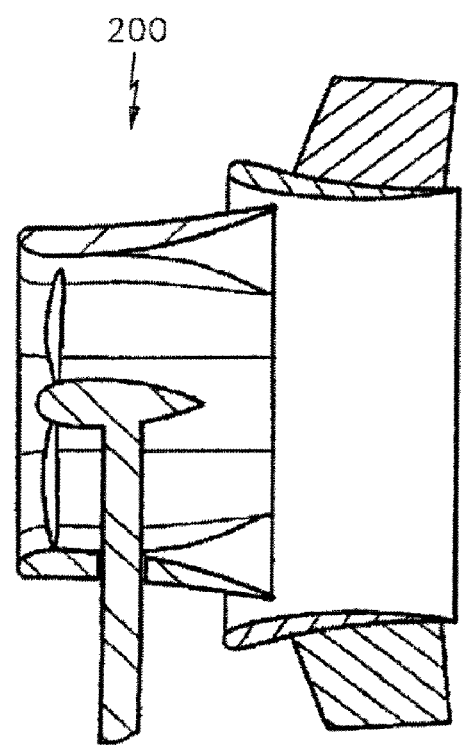
FIG. 17 is a side cross-sectional view of the MEWT of FIG. 16.
Figures 18, 19:
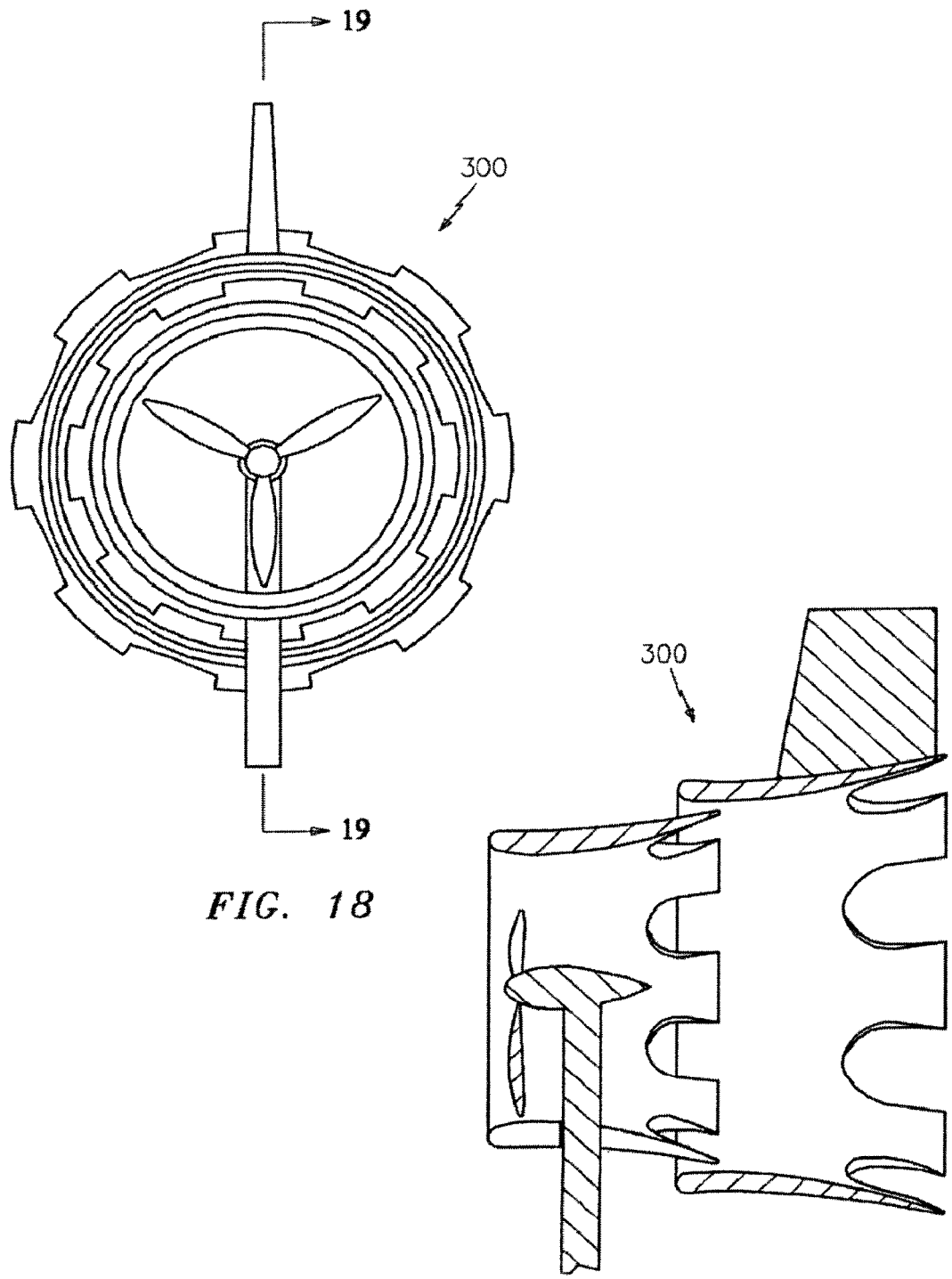
FIG. 18 is a front plan view of an alternate embodiment of the MEWT incorporating a two-stage ejector with mixing devices (here, a ring of slots) in the terminus regions of the turbine shroud (here, mixing lobes) and the ejector shroud.
FIG. 19 is a side cross-sectional view of the MEWT of FIG. 18.
Figure 20:
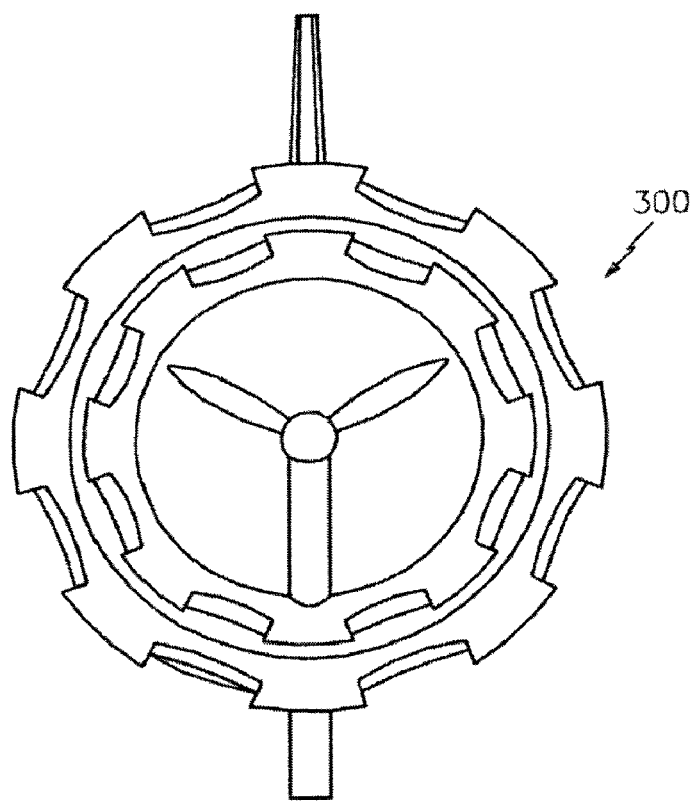
FIG. 20 is a rear view of the MEWT of FIG. 18.
Figure 21:
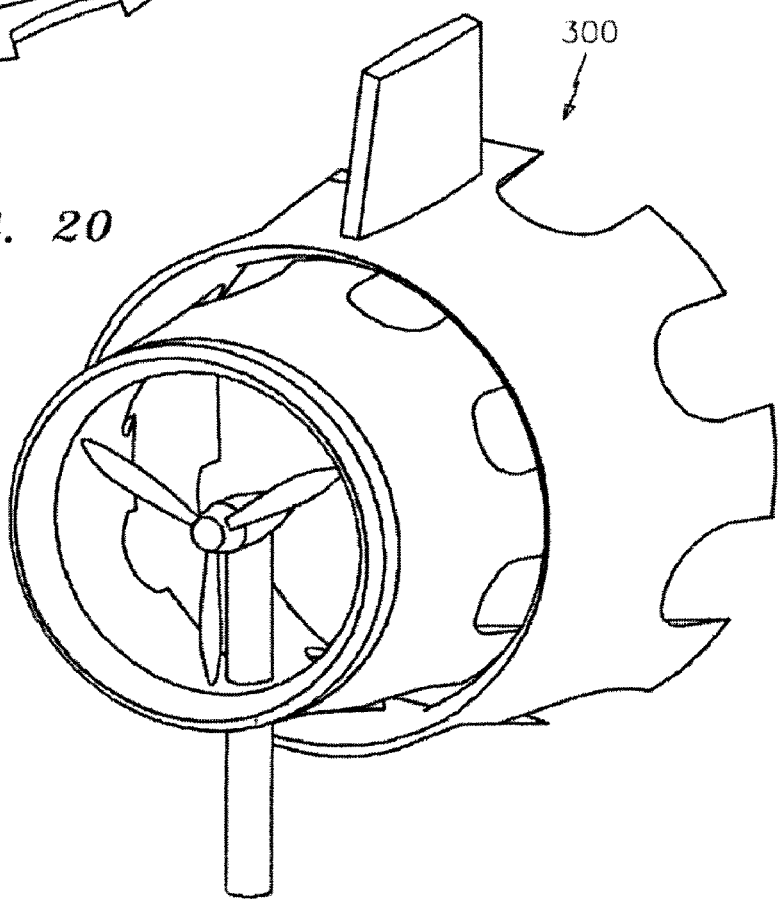
FIG. 21 is a front perspective view of the MEWT of FIG. 18.
Figure 22:
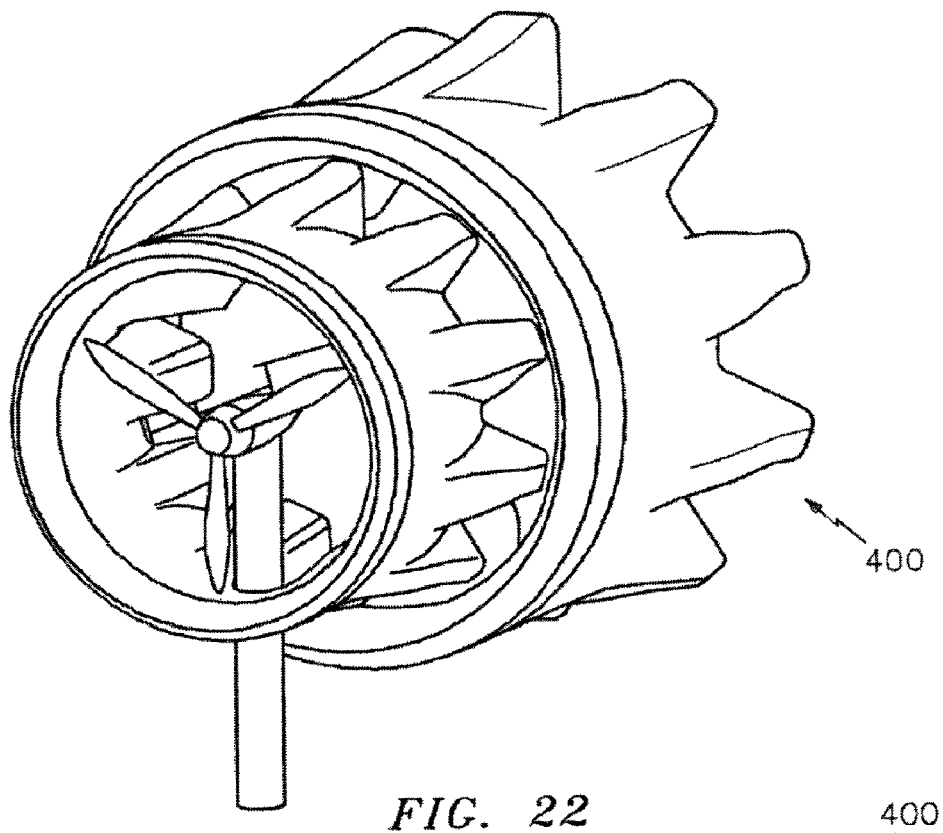
FIG. 22 is a front perspective view of an alternate embodiment of the MEWT incorporating a two-stage ejector with mixing lobes in the terminus regions of the turbine shroud and the ejector shroud.
Figure 23:
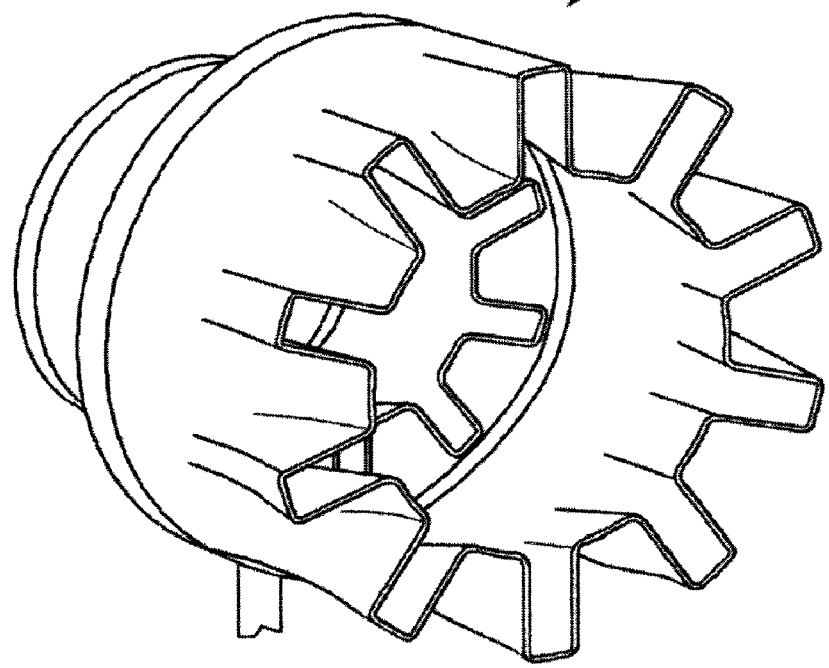
FIG. 23 is a rear perspective view of the MEWT of FIG. 22.
Figure 24:
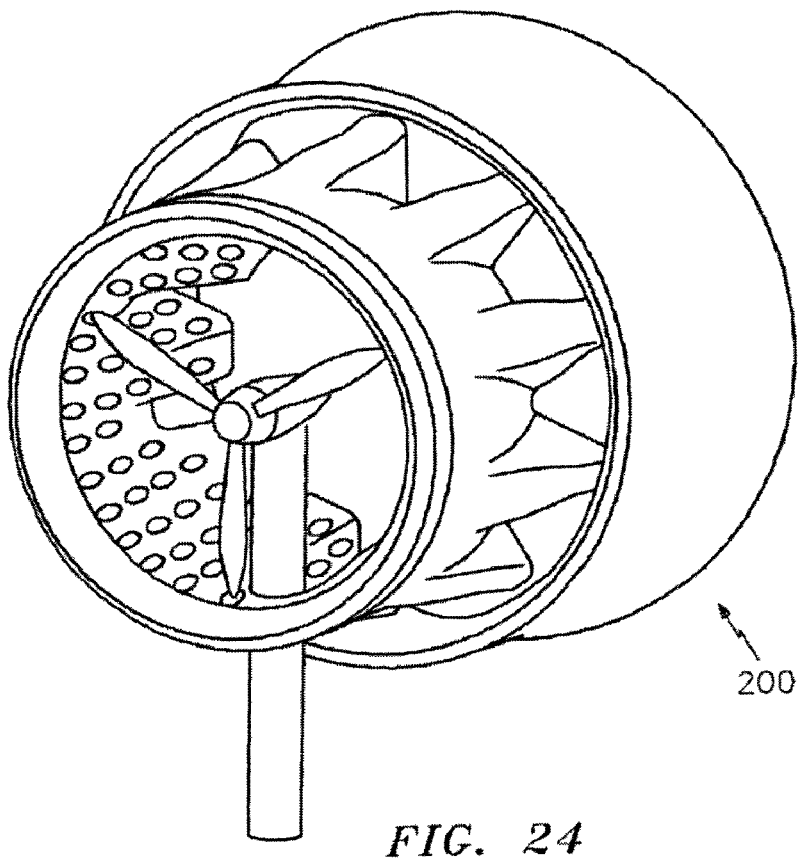
FIG. 24 shows optional acoustic lining within the turbine shroud of FIG. 22.
Figure 25:
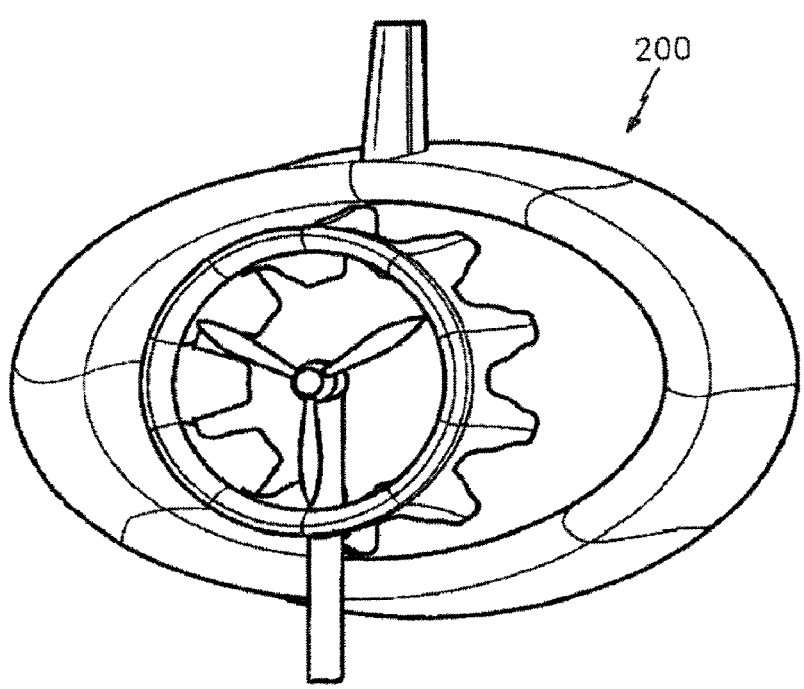
FIG. 25 shows a MEWT with a noncircular shroud component.
Figure 26:
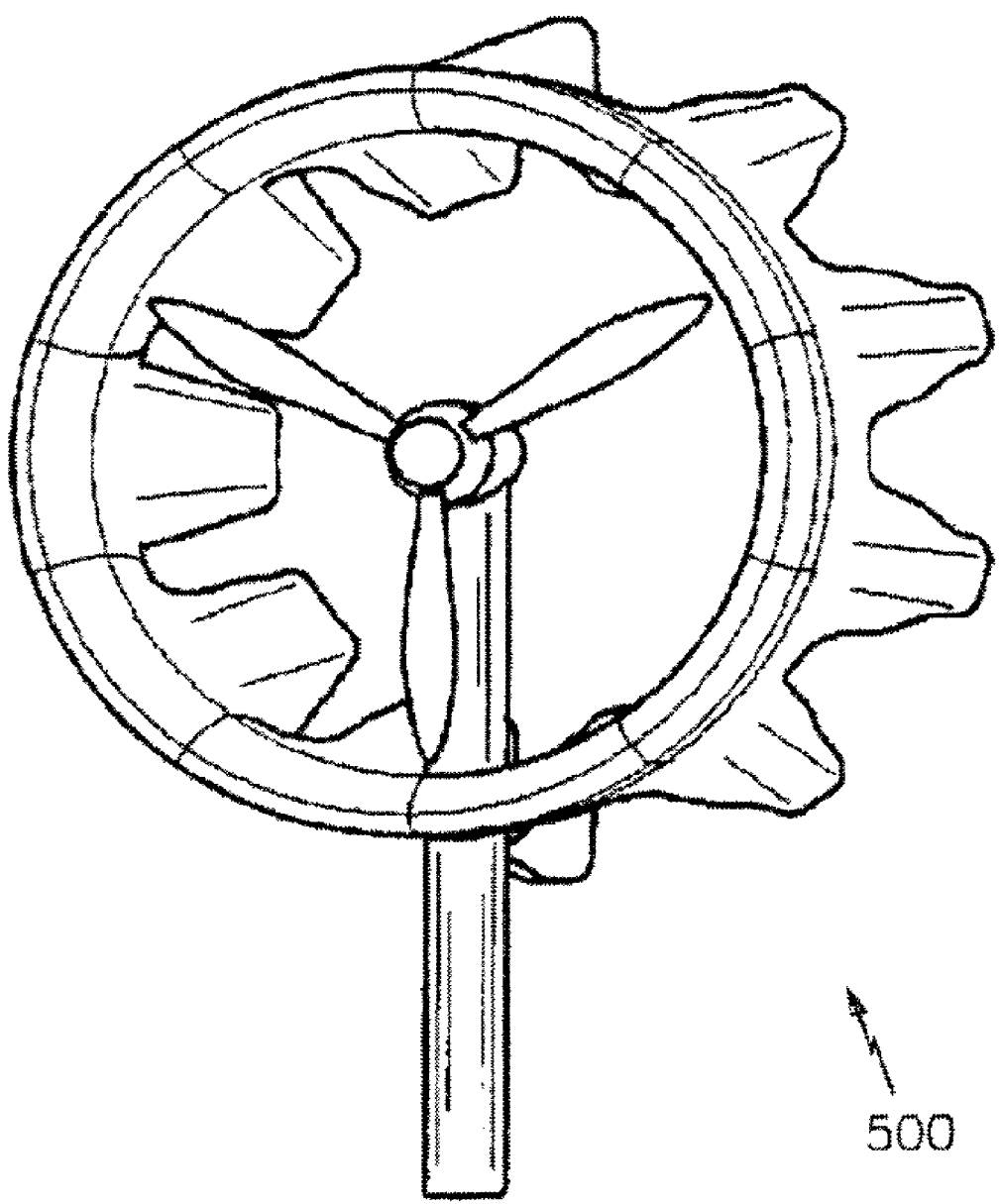
FIG. 26 shows an alternate embodiment of the preferred MEWT with mixer lobes on the terminus region (i.e., an end portion) of the turbine shroud.

FIGS. 14, 15 show optional flow blockage doors 140a, 140b. They can be rotated via linkage (not shown) into the flow stream to reduce or stop flow through the turbine 100 when damage, to the generator or other components, due to high flow velocity is possible.

Figure 8:
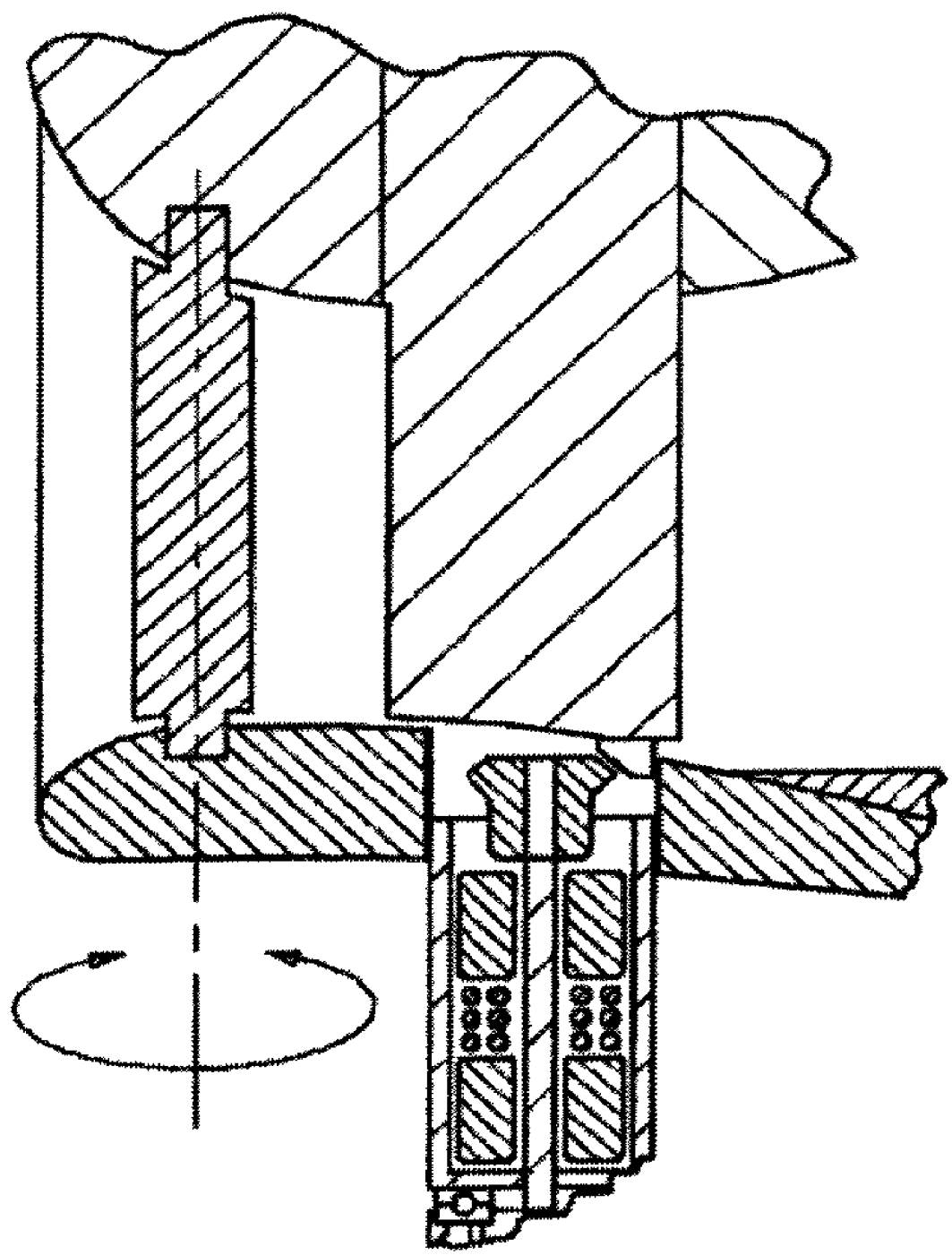
FIG. 8 is a close-up of a rotatable coupling (encircled in FIG. 7), for rotatably attaching the MEWT to a support tower, and a mechanical rotatable stator blade variation.
Figure 9:
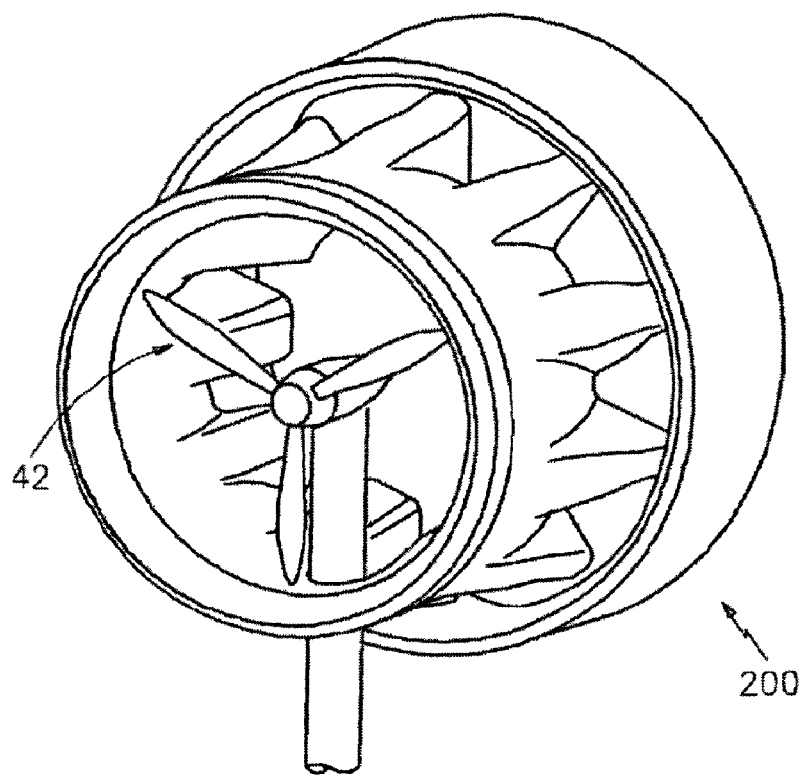
FIG. 9 is a front perspective view of an MEWT with a propeller-like rotor.
Figure 10:
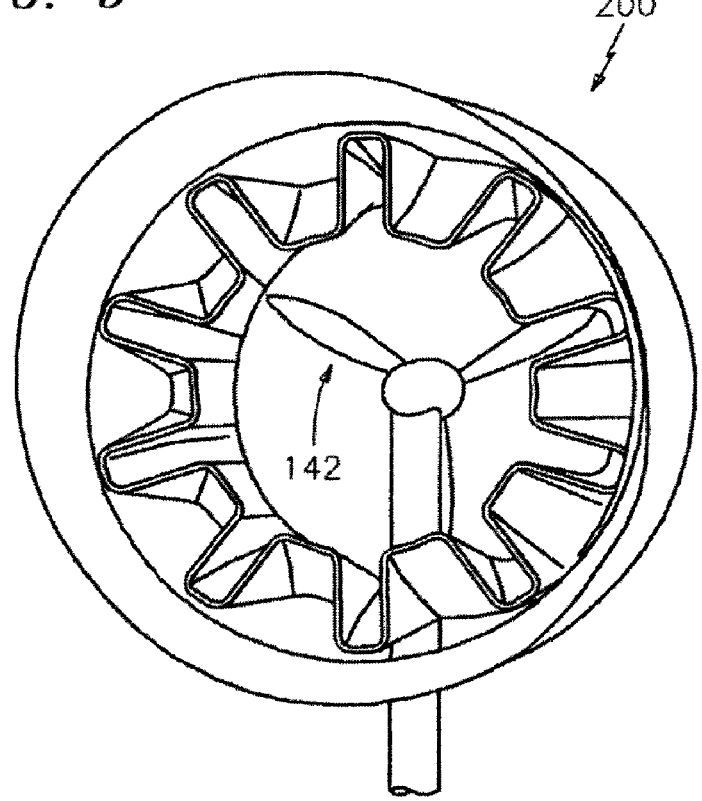
FIG. 10 is a rear perspective view of the MEWT of FIG. 9.
Figure 11:
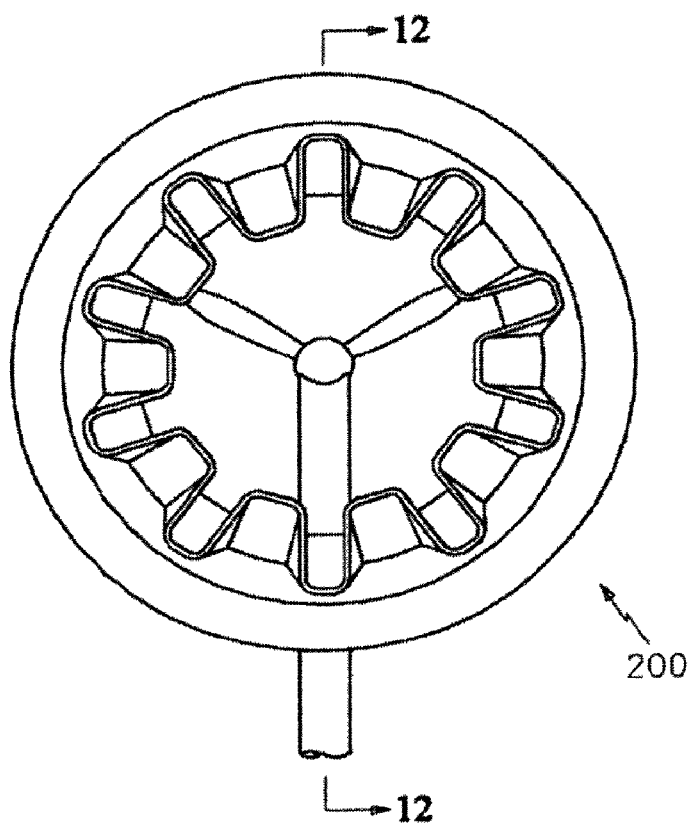
FIG. 11 shows a rear plan view of the MEWT of FIG. 9.
Figure 12:
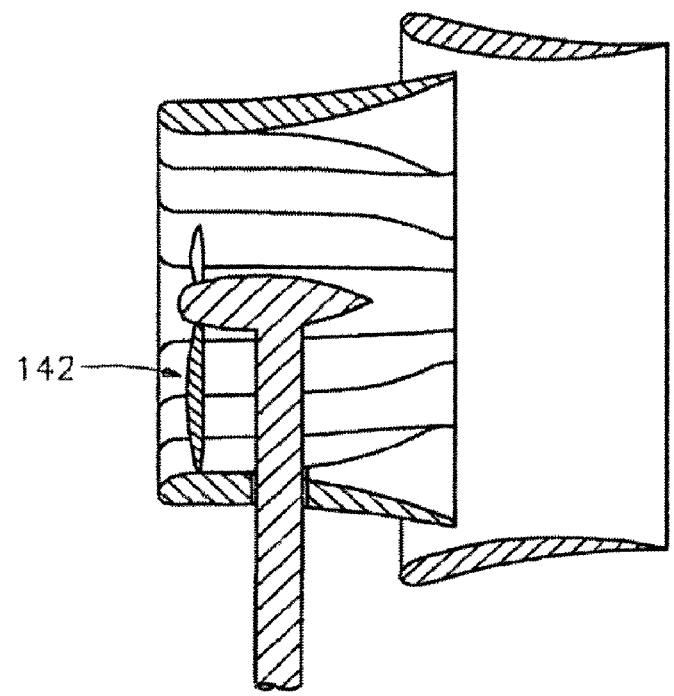
FIG. 12 is a cross-sectional view taken along sight line 12-12 of FIG. 11.
Figure 13:
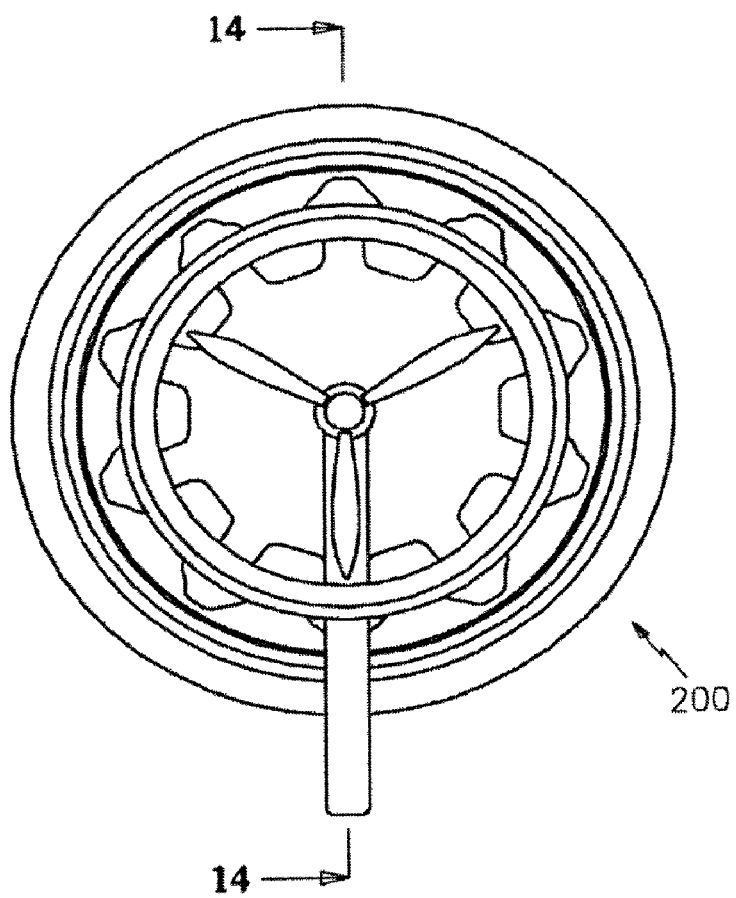
FIG. 13 is a front plan view of the MEWT of FIG. 9.

FIG. 8 presents another optional variation of Applicants' preferred MEWT 100. The stator vanes' exit-angle incidence is mechanically varied in situ (i.e., the vanes are pivoted) to accommodate variations in the fluid stream velocity so as to assure minimum residual swirl in the flow exiting the rotor.

Note that Applicants' alternate MEWT embodiments, shown in FIGS. 9-23 and 26, each use a propeller-like rotor (e.g., 142 in FIG. 9) rather than a turbine rotor with a ring of impeller blades. While perhaps not as efficient, these embodiments may be more acceptable to the public.

Applicants' alternate MEWT embodiments are variations 200, 300, 400, 500 containing zero (see, e.g., FIG. 26), one- and two-stage ejectors with mixers embedded in the terminus regions (i.e., end portions) of the ejector shrouds, if any. See, e.g., FIGS. 18, 20, and 22 for mixers embedded in the terminus regions of the ejector shrouds. Analysis indicates such MEWT embodiments will more quickly eliminate the inherent velocity defect occurring in the wake of existing wind turbines and thus reduce the separation distance required in a wind farm to avoid structural damage and/or loss of productivity.

Figure 6:
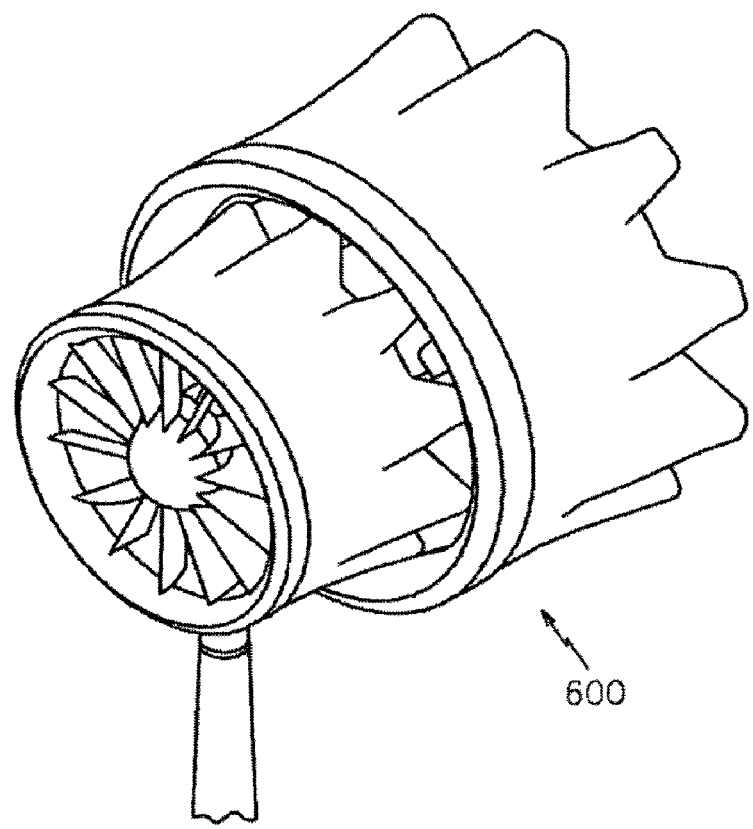
FIG. 6 is an alternate embodiment of the preferred MEWT with a mixer/ejector pump having mixer lobes on the terminus regions (i.e., an end portion) of the ejector shroud.

FIG. 6 shows a "two-stage" ejector variation 600 of the pictured embodiment 100 having a mixer at the terminus region of the ejector shroud.

The ejector design concepts described herein can significantly enhance fluid dynamic performance. The basic concept is as depicted in FIGS. 32, 44, 45, and 46, and involves the use of convoluted lobed-mixers to enhance the flow through single and multi-stage ejectors. These mixer-ejector systems provide numerous advantages over conventional systems with and without ejectors, such as: shorter ejector lengths; increased mass flow into and through the system; lower sensitivity to inlet flow blockage and/or misalignment with the principal flow direction; reduced aerodynamic noise; added thrust; and increased suction pressure at the primary exit.

Methods by which energy or power is produced, or by which the energy or power of a fluid turbine is increased, or by which additional amounts of energy are extracted from a fluid stream, are illustrated in FIGS. 35-40. Generally, a fluid turbine has a means for defining both (a) a primary fluid stream passing through the turbine and (b) a secondary fluid stream bypassing the turbine. The fluid turbine also has a means for extracting energy from the primary fluid stream. The turbine is placed in contact with a fluid stream to define the primary fluid stream and the secondary fluid stream. Energy is extracted from the primary fluid stream to form a reduced-energy fluid stream. The reduced-energy fluid stream is then mixed with the secondary fluid stream to transfer energy from the secondary fluid stream to the reduced-energy fluid stream. This mixing causes additional fluid to join the primary fluid stream, enhancing the flow volume through the turbine and increasing the amount of energy extracted. A reduced-pressure area also results from the mixing of the two fluid streams.

Figure 35:
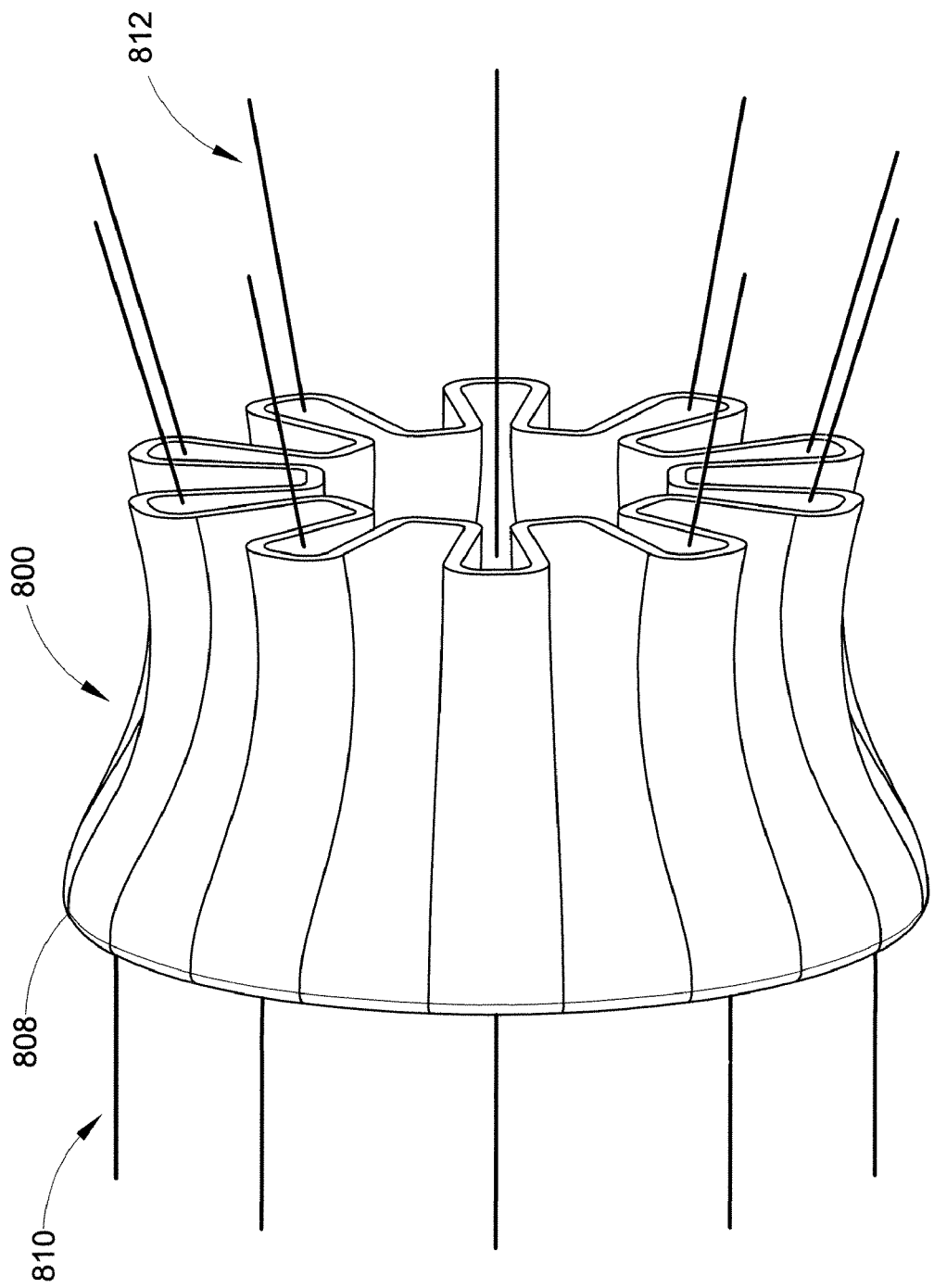
FIG. 35 is a diagram illustrating the flow of slower air through a mixer shroud.
Figure 36:
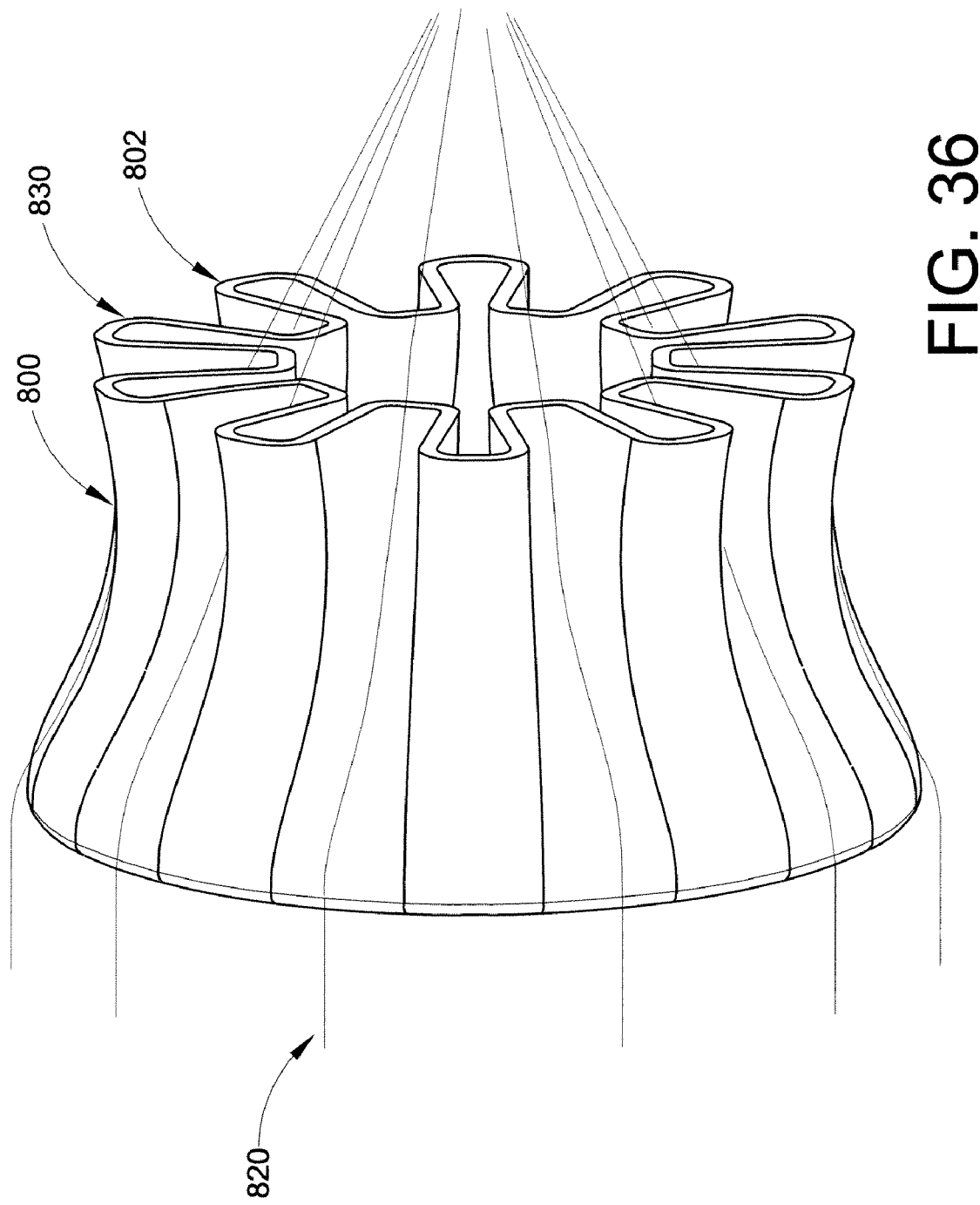
FIG. 36 is a diagram illustrating the flow of faster air around a mixer shroud.

As shown in FIGS. 35 and 36, a mixer shroud 800 surrounds a power extraction unit, such as a turbine stage (not shown). The mixer shroud 800 separates incoming fluid (e.g. wind or water) into a first fluid stream 810 that passes inside the mixer shroud and through the power extraction unit, and a second fluid stream 820 that passes outside the mixer shroud and bypasses the power extraction unit. The mixer shroud 800 has an outlet or exit end 802. A plurality of mixer lobes 830 is disposed around this outlet 802. The mixer shroud 800 also has a flared inlet 808. This mixer shroud 800 corresponds to the means for defining a primary fluid stream and a secondary fluid stream defined above. After passing through the power extraction unit, reduced-energy fluid stream 812 exits the outlet 802.

Figure 40:
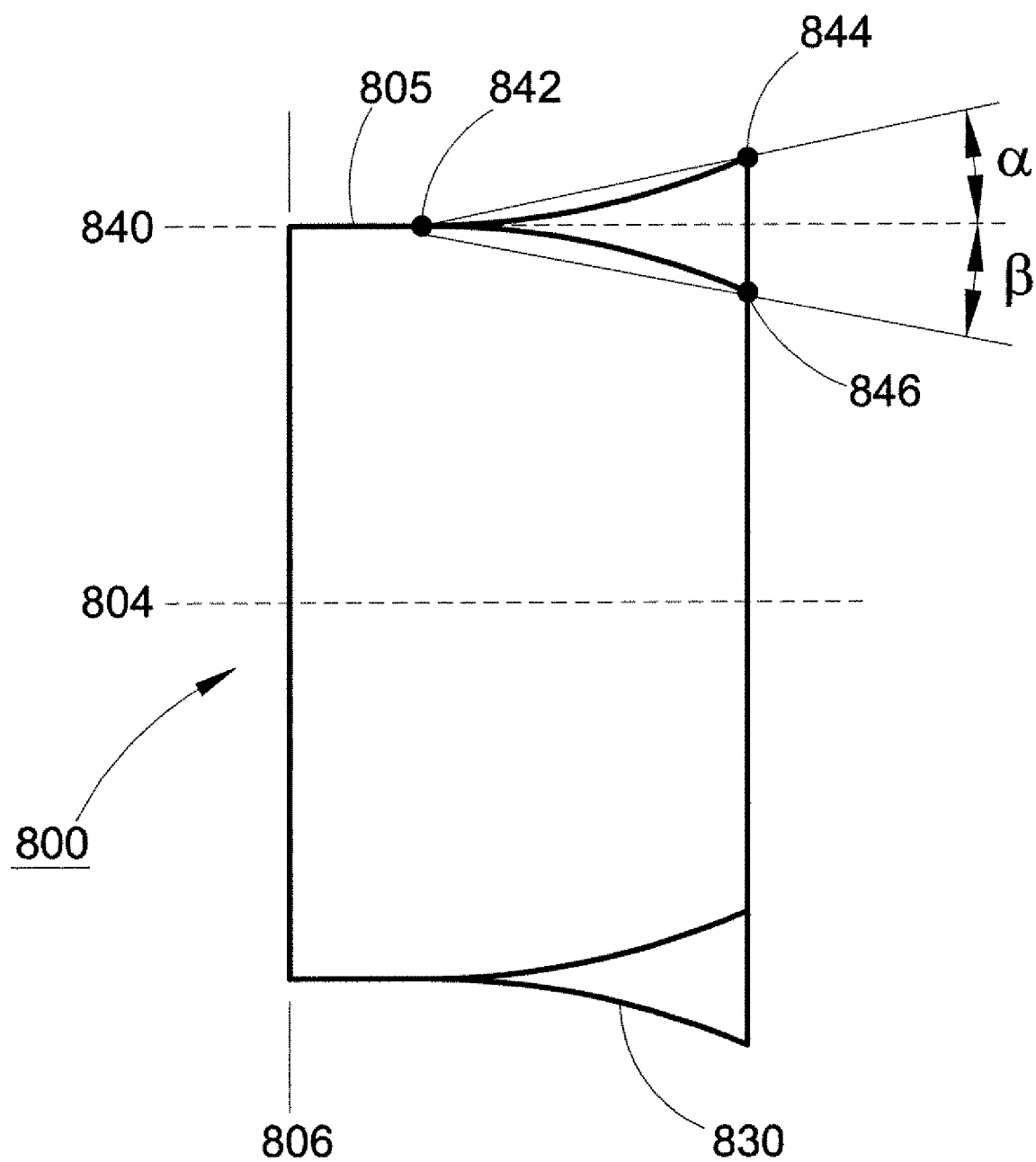
FIG. 40 is a cross-sectional diagram of a mixer shroud.

As seen in the cross-sectional view of FIG. 40, each mixer lobe 830 has an outer trailing edge angle α and an inner trailing edge angle β. The mixer shroud 800 has a central axis 804. The angles α and β are measured relative to a plane 840 which is parallel to the central axis, perpendicular to the entrance plane 806 of the mixer shroud, and along the surface 805 of the mixer shroud. The angle is measured from the vertex point 842 at which the mixer shroud begins to diverge to form the mixer lobes. The outer trailing edge angle α is measured at the outermost point 844 on the trailing edge of the mixer lobe, while the inner trailing edge angle β is measured at the innermost point 846 on the trailing edge of the mixer lobe. In some embodiments, outer trailing edge angle α and inner trailing edge angle β are different, and in others α and β are equal. In particular embodiments, inner trailing edge angle β is greater than or less than outer trailing edge angle α. As mentioned previously, each angle can be independently in the range of 5 to 25 degrees.

The turbine stage then extracts energy from the primary fluid stream to generate or produce energy or power. After the turbine stage, the primary fluid stream can also be considered a post-turbine primary fluid stream or a reduced-energy fluid stream 812, reflecting the fact that it contains less energy than before entering the turbine stage. As seen in FIG. 35, the shape of mixer shroud 800 causes primary fluid stream 810 to flare outwards after passing through the turbine. Put another way, mixer shroud 800 directs reduced-energy fluid stream 812 away from central axis 804.

As seen in FIG. 36, the shape of mixer shroud 800 causes secondary fluid stream 820 to flow inwards. Put another way, mixer shroud 800 directs secondary fluid stream 820 toward central axis 804.

Figure 37:
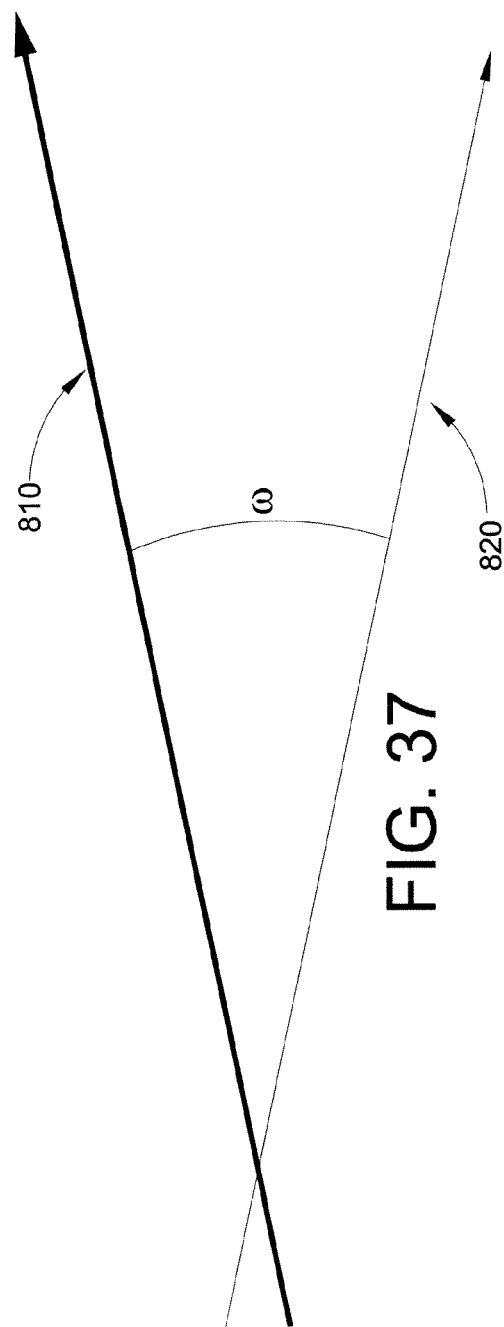
FIG. 37 is a diagram illustrating the meeting of a faster air stream and a slower air stream.

As noted in FIG. 37, post-turbine primary fluid stream 812 and secondary fluid stream 820 thus meet at an angle ω. Angle ω is typically between 10 and 50 degrees. This design of the mixer shroud takes advantage of axial voracity to mix the two fluid streams.

Figure 38:
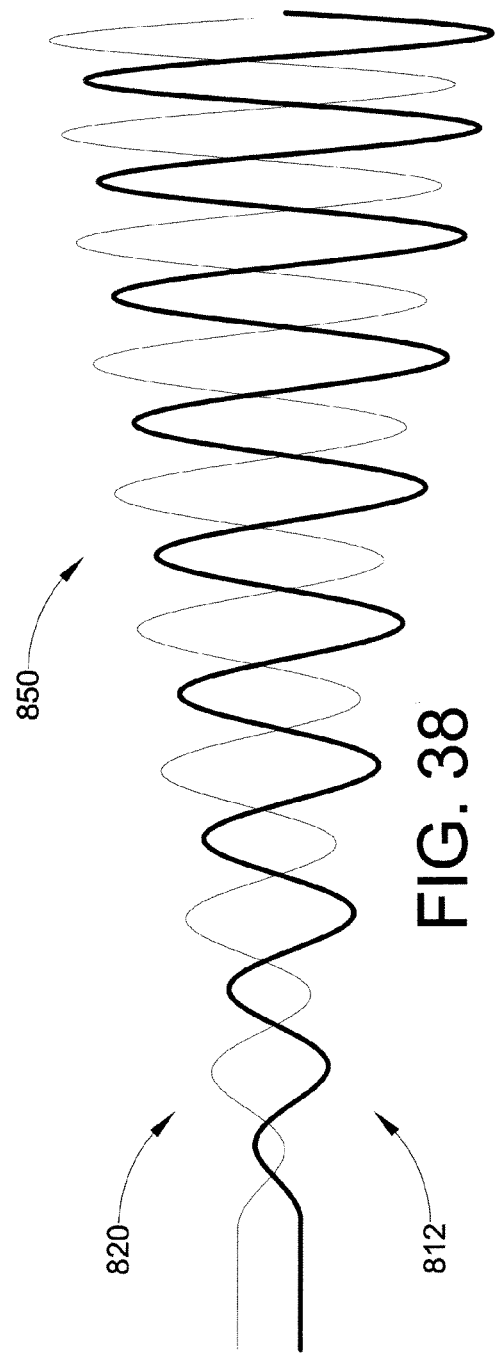
FIG. 38 is a diagram illustrating a vortex formed by the meeting of a faster air stream and a slower air stream.
Figure 39:
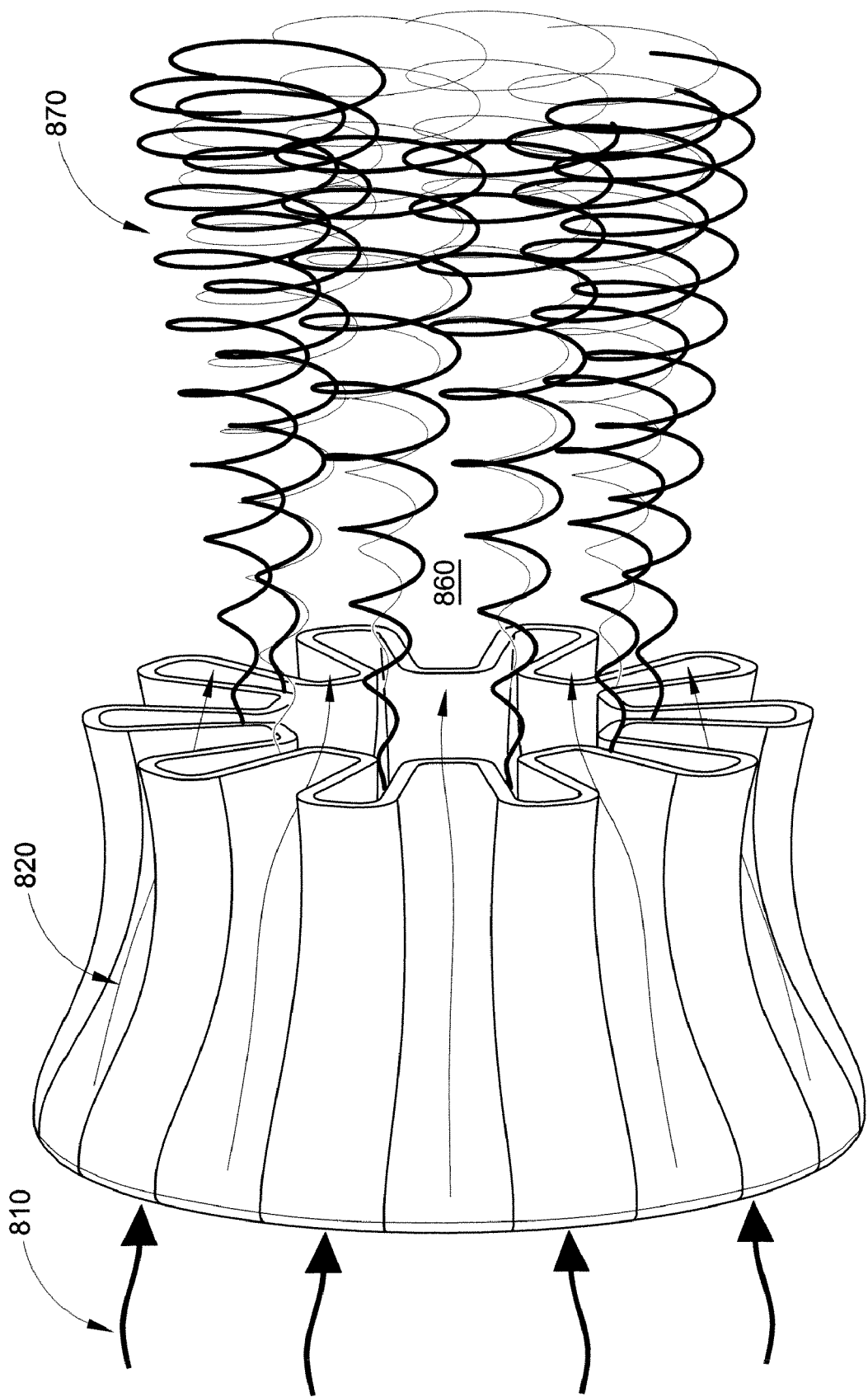
FIG. 39 is a diagram illustrating a series of vortices formed by a mixer shroud.

As shown in FIGS. 38 and 39, the meeting of the two fluid streams 812, 820 causes an "active" mixing of the two fluid streams. This differs from "passive" mixing which would generally occur only along the boundaries of two parallel fluid streams. In contrast, the active mixing here results in substantially greater energy transfer between the two fluid streams. In addition, a volume of reduced or low pressure 860 results downstream of or behind mixer shroud 800. The vortices and the reduced pressure downstream of the mixer shroud in turn pull more fluid into primary fluid stream 810 and allow the power extraction unit/turbine stage to extract more energy from the incoming fluid. Put another way, the vortices and reduced pressure cause the primary fluid 810 upstream of the turbine stage to accelerate into the mixer shroud. Described differently, the reduced/low pressure causes additional fluid to be entrained through the mixer shroud rather than passing outside the mixer shroud.

FIG. 38 illustrates a vortex 850 formed by the meeting of reduced-energy fluid stream 812 and secondary fluid stream 820 around one mixer lobe. FIG. 39 shows the series of vortices formed by the plurality of mixer lobes 830 at the outlet 802 of the mixer shroud. The vortices are formed behind the mixer shroud 800. This combination may also be considered a first exit stream 870. Another advantage of this design is that the series of vortices formed by the active mixing reduce the distance downstream of the turbine in which turbulence occurs. With conventional turbines, the resulting downstream turbulence usually means that a downstream turbine must be placed a distance of 10 times the diameter of the upstream turbine away in order to reduce fatigue failure. In contrast, the present turbines can be placed much closer together, allowing the capture of additional energy from the fluid.

Alternatively, the mixer shroud 800 can be considered as separating incoming air into a first fast fluid stream 810 and a second fast fluid stream 820. The first fast fluid stream passes through the turbine stage and energy is extracted therefrom, resulting in a slow fluid stream 812 exiting the interior of the mixer shroud, which is relatively slower than the second fast fluid stream. The slow fluid stream 812 is then mixed with the second fast fluid stream 820.

Figure 2:
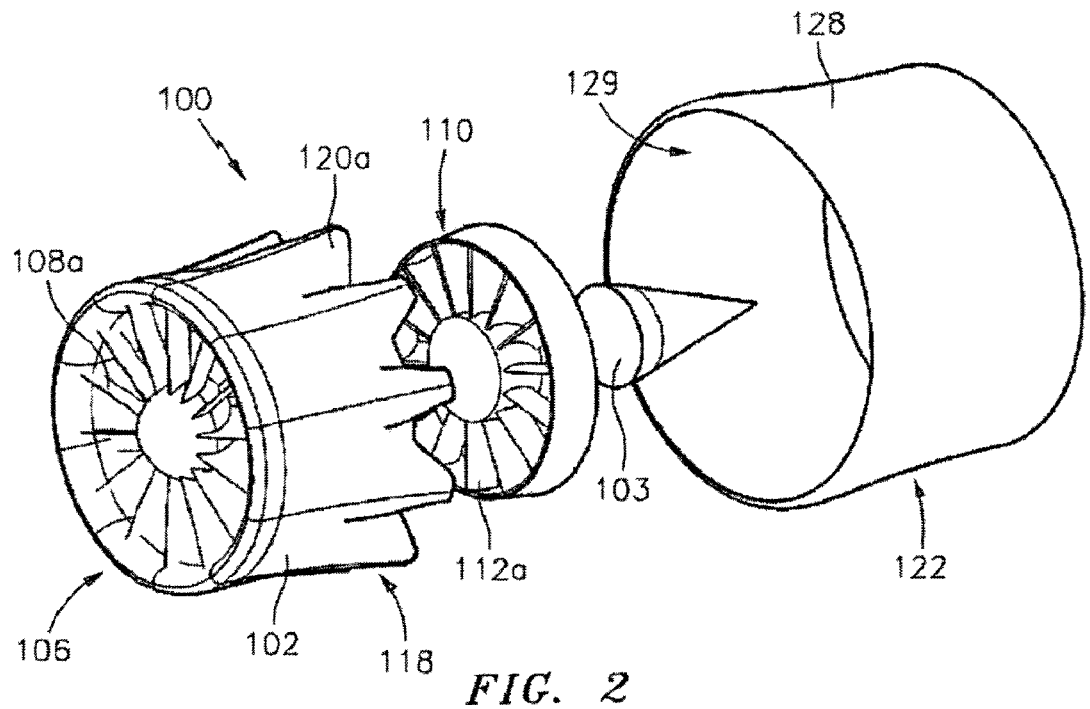
FIG. 2 is an exploded view of Applicants' preferred MEWT embodiment, constructed in accordance with the present disclosure.
Figure 3:
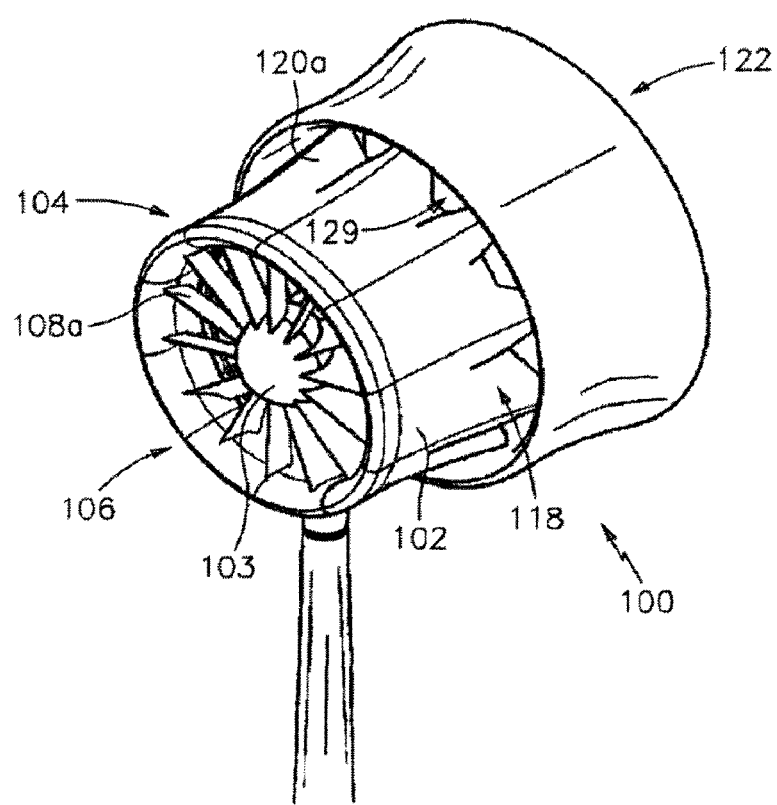
FIG. 3 is a front perspective view of the preferred MEWT attached to a support tower.
Figure 4:
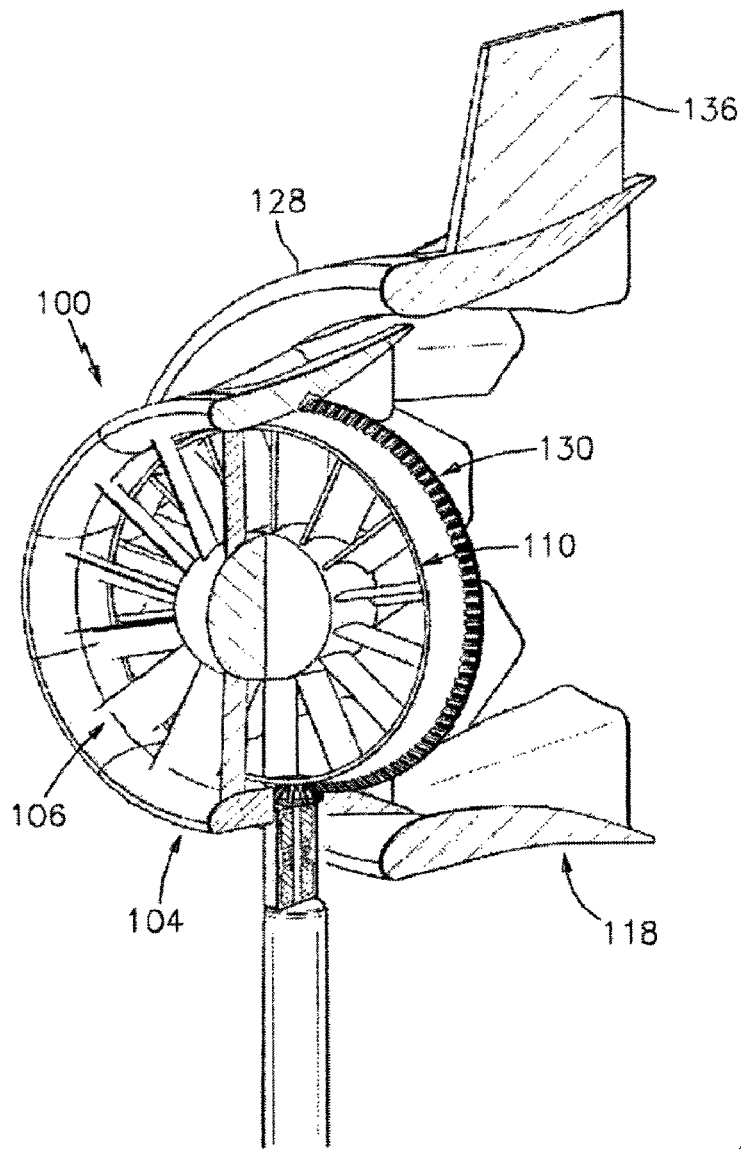
FIG. 4 is a front perspective view of a preferred MEWT with portions broken away to show interior structure, such as a power takeoff in the form of a wheel-like structure attached to the impeller.
Figure 5:
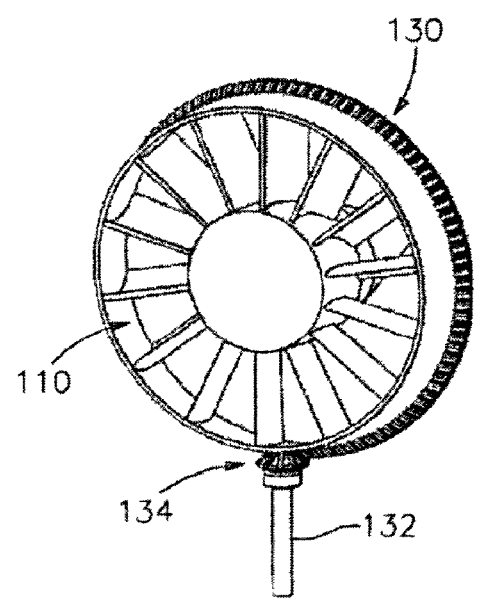
FIG. 5 is a front perspective view of just the stator, impeller, power takeoff, and support shaft from FIG. 4.

As described in FIGS. 2 and 3, an ejector shroud can also be disposed downstream from and coaxial with the mixer shroud. The outlet of the mixer shroud extends into the inlet of the ejector shroud. The ejector shroud may also have a plurality of mixer lobes around its exit end or outlet. A first exit stream 870 exiting the mixer shroud can be directed into the inlet of the ejector shroud. The ejector shroud defines a tertiary fluid stream bypassing the inlet of the ejector shroud, and directs this tertiary fluid stream towards the first exit stream, in a manner similar to the mixer shroud directing the secondary fluid stream towards the reduced-energy fluid stream. This mixing will enhance flow of the primary fluid stream through the power extraction unit and increase the amount of energy extracted.

It will be appreciated that references herein to turbines can apply to wind or water whether or not specifically identified. In addition, it should be understood by those skilled in the art that modifications can be made without departing from the spirit or scope of the disclosure. For example, slots could be used instead of the mixer lobes or the ejector lobes. In addition, no blocker arm is needed to meet or exceed the Betz limit. Accordingly, reference should be made primarily to the appended claims rather than the foregoing description.

We claim:

1. A method of increasing energy extraction from a fluid stream, comprising:
    providing an axial flow fluid turbine comprising:
        an aerodynamically contoured turbine shroud with an inlet, an outlet, and a ring of mixer lobes arranged along a trailing edge;
        a turbine stage comprising a single stator ring and a single ring of rotor blades downstream of the single stator ring, the turbine stage being positioned within the turbine shroud; and
        an ejector shroud having an inlet and an outlet, the ejector shroud being located downstream of the turbine shroud;
        wherein the turbine shroud defines a (i) primary fluid stream that passes though the turbine stage and (ii) a secondary fluid stream that bypasses the turbine stage and enters the ejector shroud inlet, and (iii) the mixer lobes are downstream of the turbine stage;
    placing the turbine in contact with a fluid stream;
    extracting energy from the primary fluid stream to form a reduced-energy fluid stream; and
    mixing the reduced-energy fluid stream with the secondary fluid stream to transfer energy from the secondary fluid stream to the reduced-energy fluid stream, thereby enhancing the flow of the primary fluid stream through the turbine and increasing the amount of energy extraction.

2. The method of claim 1, wherein the fluid turbine is a horizontal axis wind turbine.

3. The method of claim 1, wherein each mixer lobe has an inner trailing edge angle and an outer trailing edge angle, the inner angle being different from the outer angle.

4. The method of claim 3, wherein the inner angle is greater than the outer angle.

5. The method of claim 3, wherein the inner angle is less than the outer angle.

6. The method of claim 3, wherein the inner angle and the outer angle are independently in the range of 5 to 25 degrees.

7. The method of claim 1, wherein each mixer lobe has an inner trailing edge angle and an outer trailing edge angle, the inner angle being equal to the outer angle.

8. The method of claim 1, wherein the ejector shroud further comprises a ring of mixer lobes around the ejector shroud outlet.

9. The method of claim 1, wherein the mixer lobes direct the reduced-energy fluid stream away from a central axis and direct the secondary fluid stream towards the central axis.

10. The method of claim 1, wherein the inlet of the turbine shroud has a circular cross-section.

11. The method of claim 1, wherein the turbine shroud has between 6 and 14 mixer lobes.

12. The method of claim 1, wherein the ejector shroud inlet has a circular cross-section.

13. The method of claim 1, wherein the height-to-width ratio of lobe channels of the mixer lobes is between 0.5 and 4.5.

14. The method of claim 1, wherein the mixer lobes of the turbine shroud penetrate the ejector shroud between 50% and 80%.

15. The method of claim 1, wherein the length to distance (L/D) of the fluid turbine is between 0.5 and 1.25.

16. A method of increasing the amount of energy extracted by a fluid turbine, comprising:
    providing a fluid turbine comprising:
        an aerodynamically contoured turbine shroud with an inlet, an outlet, and a ring of mixer lobes arranged along a trailing edge;
        a power extraction unit comprising a single stator ring and a single ring of rotor blades downstream of the single stator ring, the turbine stage being positioned within the turbine shroud; and
        an ejector shroud having an inlet and an outlet, the ejector shroud being located downstream of the turbine shroud;
        wherein the turbine shroud defines a first fluid stream that passes though the turbine stage and (ii) a second fluid stream that bypasses the turbine stage and enters the ejector shroud inlet, and (iii) the mixer lobes are downstream of the turbine stage;
    extracting energy from the first fluid stream with the power extraction unit to produce a reduced-energy fluid stream; and
    directing the second fluid stream to mix with the reduced-energy fluid stream, thereby transferring energy from the second fluid stream to the reduced-energy fluid stream and enhancing the flow of the primary fluid stream through the power extraction unit.

17. The method of claim 16, wherein each mixer lobe has an inner trailing edge angle and an outer trailing edge angle, the inner angle being different from the outer angle.

18. The method of claim 17, wherein the inner angle and the outer angle are independently in the range of 5 to 25 degrees.

19. The method of claim 16, wherein the ejector shroud further comprises a ring of mixer lobes around the ejector shroud outlet.

20. The method of claim 16, wherein the turbine shroud directs the reduced-energy fluid stream away from a central axis and directs the second fluid stream towards the central axis.

* * * * *